(12) United States Patent
Monastiriotis et al.

(10) Patent No.: US 12,330,186 B2
(45) Date of Patent: Jun. 17, 2025

(54) CONTINUOUS MIXERS AND METHODS OF USING THE SAME

(71) Applicant: Preferred Technology, LLC, Radnor, PA (US)

(72) Inventors: Spyridon Monastiriotis, Houston, TX (US); Anthony Paul Haddock, Houston, TX (US)

(73) Assignee: PREFERRED TECHNOLOGY, LLC, Radnor, PA (US)

( * ) Notice: Subject to any disclaimer, the term of this patent is extended or adjusted under 35 U.S.C. 154(b) by 0 days.

(21) Appl. No.: 16/178,684

(22) Filed: Nov. 2, 2018

(65) Prior Publication Data

US 2019/0126314 A1    May 2, 2019

Related U.S. Application Data

(60) Provisional application No. 62/580,708, filed on Nov. 2, 2017.

(51) Int. Cl.
| | |
|---|---|
| *B05D 1/00* | (2006.01) |
| *B01F 27/111* | (2022.01) |
| *B01F 27/112* | (2022.01) |
| *B01F 27/70* | (2022.01) |
| *B01J 2/10* | (2006.01) |
| *C09K 8/80* | (2006.01) |
| *B01J 2/00* | (2006.01) |

(52) U.S. Cl.
CPC ............ *B05D 1/002* (2013.01); *B01F 27/111* (2022.01); *B01F 27/112* (2022.01); *B01F 27/70* (2022.01); *B01J 2/10* (2013.01); *C09K 8/805* (2013.01); *B01J 2/006* (2013.01); *B05D 2502/00* (2013.01); *B05D 2503/00* (2013.01); *B05D 2504/00* (2013.01); *B05D 2507/00* (2013.01)

(58) Field of Classification Search
None
See application file for complete search history.

(56) References Cited

U.S. PATENT DOCUMENTS

| | | |
|---|---|---|
| 2,163,972 A | 6/1939 | Anderson |
| 2,366,007 A | 12/1944 | D'Alelio |
| 2,653,089 A | 9/1953 | Bulson |
| 2,823,753 A | 2/1958 | Henderson |
| 3,020,250 A | 2/1962 | Norwalk |
| 3,026,938 A | 3/1962 | Huitt |
| 3,392,148 A | 7/1968 | Hunter |
| 3,492,147 A | 1/1970 | Young et al. |
| 3,763,072 A | 10/1973 | Krieger |
| 3,805,531 A | 4/1974 | Kistner |
| 3,817,939 A | 6/1974 | Allen et al. |
| 3,837,892 A | 9/1974 | Marzocchi |
| 3,900,611 A | 8/1975 | Corbett et al. |
| 3,929,191 A | 12/1975 | Graham et al. |
| 3,931,428 A | 1/1976 | Reick |
| 3,971,751 A | 7/1976 | Isayama et al. |
| 3,976,135 A | 8/1976 | Anderson |
| 3,991,225 A | 11/1976 | Blouin |
| 4,074,760 A | 2/1978 | Copeland et al. |
| 4,079,041 A | 3/1978 | Baumann et al. |
| 4,102,703 A | 7/1978 | Tully |
| 4,113,014 A | 9/1978 | Kubens et al. |
| 4,150,005 A | 4/1979 | Gehman et al. |
| 4,177,228 A | 12/1979 | Prolss |
| 4,199,484 A | 4/1980 | Murphey |
| 4,228,042 A | 10/1980 | Letton |
| 4,239,660 A | 12/1980 | Kingry |
| 4,252,655 A | 2/1981 | Carney |
| 4,260,529 A | 4/1981 | Letton |
| 4,273,910 A | 6/1981 | Lederer |
| 4,417,992 A | 11/1983 | Bhattacharyya et al. |
| 4,439,489 A | 3/1984 | Johnson et al. |
| 4,443,347 A | 4/1984 | Underdown et al. |
| 4,465,815 A | 8/1984 | Chattha |
| 4,493,875 A | 1/1985 | Beck et al. |
| 4,517,330 A | 5/1985 | Zdanowski et al. |
| 4,518,039 A | 5/1985 | Graham et al. |
| 4,547,469 A | 10/1985 | Jackson et al. |
| 4,553,596 A | 11/1985 | Graham et al. |
| 4,554,188 A | 11/1985 | Holubka et al. |
| 4,580,633 A | 4/1986 | Watkins et al. |
| 4,585,064 A | 4/1986 | Graham et al. |
| 4,592,931 A | 6/1986 | Cargle |
| 4,594,268 A | 6/1986 | Kirwin |
| 4,623,589 A | 11/1986 | Simmonds, Jr. |

(Continued)

FOREIGN PATENT DOCUMENTS

| | | |
|---|---|---|
| CA | 1087833 A | 10/1980 |
| CA | 2423031 A1 | 10/2003 |

(Continued)

OTHER PUBLICATIONS

Office Action dated Jun. 6, 2017 in U.S. Appl. No. 14/528,070.
Notice of Allowance dated Jun. 12, 2017 in U.S. Appl. No. 14/266,179.
Non-final Office Action dated Jul. 12, 2017 in U.S. Appl. No. 14/798,774.
Final Office Action dated Jun. 26, 2017 in U.S. Appl. No. 14/673,340.
Non-final Office Action dated Aug. 29, 2017 in U.S. Appl. No. 15/003,118.

(Continued)

*Primary Examiner* — Tabatha L Penny
(74) *Attorney, Agent, or Firm* — Troutman Pepper Locke LLP

(57) ABSTRACT

The disclosure provides continuous mixers and methods of using thereof including in the production of coated particles and proppants used in hydraulic fracturing techniques, by the application of coatings along the length of the continuous mixer through the use of a plurality of paddles configured within the continuous mixer.

18 Claims, 5 Drawing Sheets

(56) References Cited

U.S. PATENT DOCUMENTS

| | | | |
|---|---|---|---|
| 4,632,876 A | 12/1986 | Laird et al. | |
| 4,680,230 A | 7/1987 | Gibb et al. | |
| 4,732,920 A | 3/1988 | Graham et al. | |
| 4,746,543 A | 5/1988 | Zinkan et al. | |
| 4,785,884 A | 11/1988 | Armbruster | |
| 4,792,262 A | 12/1988 | Kapps et al. | |
| 4,801,635 A | 1/1989 | Zinkan et al. | |
| 4,822,425 A | 4/1989 | Burch | |
| 4,920,192 A | 4/1990 | Wiser-Halladay | |
| 5,043,484 A | 8/1991 | Knifton et al. | |
| 5,048,608 A | 9/1991 | Wiser-Halladay et al. | |
| 5,073,195 A | 12/1991 | Cuthbert et al. | |
| 5,092,404 A | 3/1992 | Falk et al. | |
| 5,138,055 A | 8/1992 | Parekh | |
| 5,159,123 A | 10/1992 | Knifton et al. | |
| 5,181,957 A | 1/1993 | Gross et al. | |
| 5,188,175 A | 2/1993 | Sweet | |
| 5,194,174 A | 3/1993 | Roe et al. | |
| 5,199,491 A | 4/1993 | Kutta et al. | |
| 5,218,038 A | 6/1993 | Johnson et al. | |
| 5,242,248 A | 9/1993 | Bramwell | |
| 5,256,729 A | 10/1993 | Kutta et al. | |
| 5,264,572 A | 11/1993 | Endo et al. | |
| 5,330,836 A | 7/1994 | Buese et al. | |
| 5,376,629 A | 12/1994 | Smith | |
| 5,420,174 A | 5/1995 | Dewprashad | |
| 5,422,183 A | 6/1995 | Sinclair et al. | |
| 5,480,584 A | 1/1996 | Urano et al. | |
| 5,494,599 A * | 2/1996 | Goovaerts | C11D 17/065 510/305 |
| 5,582,249 A | 12/1996 | Caveny et al. | |
| 5,597,784 A | 1/1997 | Sinclair et al. | |
| 5,663,136 A * | 9/1997 | Van Dijk | B01J 2/10 510/108 |
| 5,721,315 A | 2/1998 | Evans et al. | |
| 5,728,302 A | 3/1998 | Connor et al. | |
| 5,733,952 A | 3/1998 | Geoffrey | |
| 5,824,462 A | 10/1998 | Ashida et al. | |
| 5,837,656 A | 11/1998 | Sinclair et al. | |
| 5,849,818 A | 12/1998 | Walles et al. | |
| 5,856,271 A | 1/1999 | Cataldo et al. | |
| 5,869,570 A | 2/1999 | Eaton et al. | |
| 5,911,876 A | 6/1999 | Rose | |
| 5,924,488 A | 7/1999 | Nguyen et al. | |
| 5,935,923 A * | 8/1999 | Gupta | C11D 11/04 510/444 |
| 5,955,144 A | 9/1999 | Sinclair et al. | |
| 5,964,291 A | 10/1999 | Bourne et al. | |
| 5,985,986 A | 11/1999 | Kubitza et al. | |
| 6,003,600 A | 12/1999 | Nguyen et al. | |
| 6,071,990 A | 6/2000 | Mp et al. | |
| 6,079,492 A | 6/2000 | Hoogteijling et al. | |
| 6,093,469 A | 7/2000 | Callas | |
| 6,093,496 A | 7/2000 | Dominguez et al. | |
| 6,114,410 A | 9/2000 | Betzold | |
| 6,127,308 A | 10/2000 | Slack et al. | |
| 6,187,892 B1 | 2/2001 | Markusch et al. | |
| 6,207,766 B1 | 3/2001 | Poi et al. | |
| 6,270,692 B1 | 8/2001 | Geissler et al. | |
| 6,306,964 B1 | 10/2001 | Evans et al. | |
| 6,316,105 B1 | 11/2001 | Khudyakov et al. | |
| 6,328,105 B1 | 12/2001 | Betzold | |
| 6,372,842 B1 | 4/2002 | Grisso et al. | |
| 6,387,501 B1 | 5/2002 | McCrary et al. | |
| 6,406,789 B1 | 6/2002 | McDaniel et al. | |
| 6,413,647 B1 | 7/2002 | Hayashi et al. | |
| 6,439,309 B1 | 8/2002 | Matherly et al. | |
| 6,528,157 B1 | 3/2003 | Hussain et al. | |
| 6,582,819 B2 | 6/2003 | McDaniel et al. | |
| 6,632,527 B1 | 10/2003 | McDaniel et al. | |
| 6,683,038 B2 | 1/2004 | Forth et al. | |
| 6,705,400 B1 | 3/2004 | Nguyen et al. | |
| 6,732,800 B2 | 5/2004 | Acock et al. | |
| 6,756,124 B2 | 6/2004 | Kanamori et al. | |
| 6,767,978 B2 | 7/2004 | Aubart et al. | |
| 6,790,245 B2 | 9/2004 | Wolff et al. | |
| 6,794,354 B1 * | 9/2004 | Mort, III | C11D 11/0082 264/117 |
| 6,809,149 B2 | 10/2004 | Meyer et al. | |
| 6,866,099 B2 | 3/2005 | Nguyen | |
| 6,875,728 B2 | 4/2005 | Gupta et al. | |
| 6,906,009 B2 | 6/2005 | Shinbach et al. | |
| 6,913,080 B2 | 7/2005 | Lehman et al. | |
| 7,012,043 B2 | 3/2006 | Klein et al. | |
| 7,074,257 B2 | 7/2006 | Lockwood et al. | |
| 7,078,442 B2 | 7/2006 | Brown | |
| 7,129,308 B2 | 10/2006 | McGall et al. | |
| 7,135,231 B1 | 11/2006 | Sinclair et al. | |
| 7,157,021 B2 | 1/2007 | Bytnar et al. | |
| 7,216,711 B2 | 5/2007 | Nguyen et al. | |
| 7,244,492 B2 | 7/2007 | Sinclair et al. | |
| 7,247,350 B2 | 7/2007 | Sepeur et al. | |
| 7,261,156 B2 | 8/2007 | Nguyen et al. | |
| 7,281,580 B2 | 10/2007 | Parker et al. | |
| 7,281,581 B2 | 10/2007 | Nguyen et al. | |
| 7,318,472 B2 | 1/2008 | Smith | |
| 7,318,474 B2 | 1/2008 | Welton et al. | |
| 7,322,411 B2 | 1/2008 | Brannon et al. | |
| 7,326,346 B2 | 2/2008 | Lovell et al. | |
| 7,332,089 B2 | 2/2008 | Harjula et al. | |
| 7,334,783 B2 | 2/2008 | Yoneyama et al. | |
| 7,343,973 B2 | 3/2008 | Dusterhoft et al. | |
| 7,344,783 B2 | 3/2008 | Shea | |
| 7,350,571 B2 | 4/2008 | Nguyen et al. | |
| 7,399,715 B2 | 7/2008 | Tsuchiya et al. | |
| 7,528,096 B2 | 5/2009 | Brannon et al. | |
| 7,537,702 B2 | 5/2009 | Lupton et al. | |
| 7,541,318 B2 | 6/2009 | Weaver et al. | |
| 7,678,872 B2 | 3/2010 | Glass et al. | |
| 7,721,804 B2 | 5/2010 | Duenckel | |
| 7,726,399 B2 | 6/2010 | Brannon et al. | |
| 7,754,659 B2 | 7/2010 | Rediger et al. | |
| 7,772,163 B1 | 8/2010 | Brannon et al. | |
| 7,789,147 B2 | 9/2010 | Brannon et al. | |
| 7,803,742 B2 | 9/2010 | Bicerano et al. | |
| 7,884,043 B2 | 2/2011 | Lisetskiy et al. | |
| 7,896,080 B1 | 3/2011 | Watters et al. | |
| 7,906,474 B2 | 3/2011 | Varineau et al. | |
| 7,919,183 B2 | 4/2011 | McDaniel et al. | |
| 7,921,910 B2 | 4/2011 | Wilson et al. | |
| 7,932,295 B2 | 4/2011 | Tsuchiya et al. | |
| 7,999,013 B2 | 8/2011 | Brown | |
| 8,006,754 B2 | 8/2011 | Bicerano | |
| 8,006,755 B2 | 8/2011 | Bicerano | |
| 8,052,890 B2 | 11/2011 | Nguyen | |
| 8,183,179 B2 | 5/2012 | Garcia-Lopez De Victoria et al. | |
| 8,236,738 B2 | 8/2012 | Zhang | |
| 8,258,206 B2 | 9/2012 | Kanagasabapathy et al. | |
| 8,298,667 B2 | 10/2012 | Smith et al. | |
| 8,338,351 B2 | 12/2012 | Kanagasabapathy et al. | |
| 8,349,911 B2 | 1/2013 | Kuehnle | |
| 8,354,279 B2 | 1/2013 | Nguyen et al. | |
| 8,360,149 B2 | 1/2013 | Hughes et al. | |
| 8,431,220 B2 | 4/2013 | Wu et al. | |
| 8,506,216 B2 | 8/2013 | Hiroshima et al. | |
| 8,513,342 B2 | 8/2013 | Gao et al. | |
| 8,524,441 B2 | 9/2013 | Zhang et al. | |
| 8,592,015 B2 | 11/2013 | Bicker et al. | |
| 8,604,132 B2 | 12/2013 | Jakubowski et al. | |
| 8,664,151 B2 | 3/2014 | Haeberle et al. | |
| 8,686,081 B2 | 4/2014 | Eichman et al. | |
| 8,763,700 B2 | 7/2014 | McDaniel et al. | |
| 8,785,356 B2 | 7/2014 | Plotnikov et al. | |
| 8,796,188 B2 | 8/2014 | Pisklak et al. | |
| 8,826,083 B2 | 9/2014 | Yamasaki et al. | |
| 9,097,996 B2 | 8/2015 | Hille | |
| 9,487,692 B2 | 11/2016 | Nguyen et al. | |
| 9,523,030 B2 | 12/2016 | Zhang | |
| 9,562,187 B2 | 2/2017 | McCrary et al. | |
| 9,624,421 B2 | 4/2017 | McDaniel et al. | |
| 9,790,422 B2 | 10/2017 | McDaniel | |
| 10,087,360 B2 | 10/2018 | McDaniel et al. | |
| 10,208,242 B2 | 2/2019 | McCrary et al. | |
| 2001/0014453 A1 | 8/2001 | McGall et al. | |

(56) References Cited

U.S. PATENT DOCUMENTS

| | | |
|---|---|---|
| 2002/0048676 A1 | 4/2002 | McDaniel et al. |
| 2003/0102128 A1 | 6/2003 | Dawson et al. |
| 2003/0131998 A1 | 7/2003 | Nguyen et al. |
| 2003/0168217 A1 | 9/2003 | Zhang et al. |
| 2003/0196805 A1 | 10/2003 | Boney |
| 2003/0224165 A1 | 12/2003 | Anderson et al. |
| 2004/0010267 A1 | 1/2004 | Nakamura et al. |
| 2004/0023818 A1 | 2/2004 | Nguyen et al. |
| 2004/0129923 A1 | 7/2004 | Nguyen et al. |
| 2004/0138343 A1 | 7/2004 | Campbell et al. |
| 2004/0211561 A1 | 10/2004 | Nguyen et al. |
| 2004/0244978 A1 | 12/2004 | Shaarpour |
| 2005/0018193 A1 | 1/2005 | Chilese et al. |
| 2005/0019574 A1 | 1/2005 | Mccrary |
| 2005/0028979 A1 | 2/2005 | Brannon et al. |
| 2005/0034861 A1 | 2/2005 | Saini et al. |
| 2005/0173116 A1 | 8/2005 | Nguyen et al. |
| 2005/0244641 A1 | 11/2005 | Vincent |
| 2005/0244658 A1 | 11/2005 | Bae et al. |
| 2005/0274523 A1 | 12/2005 | Brannon et al. |
| 2006/0035790 A1 | 2/2006 | Okell et al. |
| 2006/0073980 A1 | 4/2006 | Brannon et al. |
| 2006/0118300 A1 | 6/2006 | Welton et al. |
| 2006/0157243 A1 | 7/2006 | Nguyen |
| 2006/0241198 A1 | 10/2006 | Motz et al. |
| 2006/0243441 A1 | 11/2006 | Cornelius de Grood et al. |
| 2006/0260808 A1 | 11/2006 | Weaver et al. |
| 2006/0283599 A1 | 12/2006 | Nguyen et al. |
| 2006/0292345 A1 | 12/2006 | Dave et al. |
| 2007/0021309 A1 | 1/2007 | Bicerano |
| 2007/0034373 A1 | 2/2007 | McDaniel et al. |
| 2007/0036977 A1 | 2/2007 | Sinclair et al. |
| 2007/0066742 A1 | 3/2007 | Mhetar et al. |
| 2007/0073590 A1 | 3/2007 | Cosentino et al. |
| 2007/0079965 A1 | 4/2007 | Nguyen et al. |
| 2007/0088137 A1 | 4/2007 | Georgeau et al. |
| 2007/0161515 A1 | 7/2007 | Bicerano |
| 2007/0204992 A1 | 9/2007 | Davis et al. |
| 2007/0207186 A1 | 9/2007 | Scanlon et al. |
| 2007/0208156 A1 | 9/2007 | Posey et al. |
| 2007/0209794 A1 | 9/2007 | Kaufman et al. |
| 2007/0215354 A1 | 9/2007 | Rickman et al. |
| 2007/0228322 A1 | 10/2007 | Chaves et al. |
| 2007/0289781 A1 | 12/2007 | Rickman et al. |
| 2008/0011478 A1 | 1/2008 | Welton et al. |
| 2008/0063868 A1 | 3/2008 | Chung et al. |
| 2008/0087429 A1 | 4/2008 | Brannon et al. |
| 2008/0161212 A1 | 7/2008 | Welton et al. |
| 2008/0202744 A1 | 8/2008 | Crews et al. |
| 2008/0202750 A1 | 8/2008 | Rediger et al. |
| 2008/0226704 A1 | 9/2008 | Kigoshi et al. |
| 2008/0230223 A1 | 9/2008 | McCrary et al. |
| 2008/0236825 A1 | 10/2008 | Barmatov et al. |
| 2008/0318812 A1 | 12/2008 | Kakadjian, Sr. et al. |
| 2009/0029097 A1 | 1/2009 | Riddle et al. |
| 2009/0044942 A1 | 2/2009 | Gupta |
| 2009/0107673 A1 | 4/2009 | Huang et al. |
| 2009/0176667 A1 | 7/2009 | Nguyen |
| 2009/0238988 A1 | 9/2009 | McDaniel et al. |
| 2010/0028542 A1 | 2/2010 | Reese et al. |
| 2010/0065271 A1 | 3/2010 | McCrary et al. |
| 2010/0105817 A1 | 4/2010 | Arkles et al. |
| 2010/0132943 A1 | 6/2010 | Nguyen et al. |
| 2010/0147507 A1 | 6/2010 | Korte et al. |
| 2010/0196621 A1 | 8/2010 | Larson-Smith et al. |
| 2010/0212898 A1 | 8/2010 | Nguyen et al. |
| 2010/0282462 A1 | 11/2010 | Xu et al. |
| 2010/0286000 A1 | 11/2010 | Huang et al. |
| 2011/0016837 A1 | 1/2011 | Fischer et al. |
| 2011/0024129 A1 | 2/2011 | Turakhia et al. |
| 2011/0030950 A1 | 2/2011 | Weaver et al. |
| 2011/0053809 A1 | 3/2011 | Sanders et al. |
| 2011/0098492 A1 | 4/2011 | Varineau et al. |
| 2011/0104371 A1* | 5/2011 | Mizwicki ............ B01F 7/081 427/214 |
| 2011/0120719 A1 | 5/2011 | Soane et al. |
| 2011/0160097 A1 | 6/2011 | Mirzaei et al. |
| 2011/0162837 A1 | 7/2011 | O'Malley et al. |
| 2011/0230612 A1 | 9/2011 | Eldredge et al. |
| 2011/0244125 A1 | 10/2011 | Weisenberg et al. |
| 2011/0272146 A1 | 11/2011 | Green et al. |
| 2011/0297383 A1 | 12/2011 | Tanguay et al. |
| 2012/0018162 A1 | 1/2012 | Tanguay et al. |
| 2012/0040194 A1 | 2/2012 | Kanai et al. |
| 2012/0122363 A1 | 5/2012 | Owens |
| 2012/0267105 A1 | 10/2012 | Zhang |
| 2012/0267112 A1 | 10/2012 | Zhang et al. |
| 2012/0277130 A1 | 11/2012 | Usova |
| 2012/0279703 A1 | 11/2012 | McDaniel et al. |
| 2012/0280419 A1 | 11/2012 | Martin et al. |
| 2012/0283153 A1 | 11/2012 | McDaniel et al. |
| 2012/0283155 A1 | 11/2012 | Huang et al. |
| 2012/0295114 A1 | 11/2012 | Rediger et al. |
| 2012/0318514 A1 | 12/2012 | Mesher |
| 2012/0322925 A1 | 12/2012 | Arigo et al. |
| 2013/0005856 A1 | 1/2013 | Phonthammachai et al. |
| 2013/0037048 A1 | 2/2013 | Edgington et al. |
| 2013/0045901 A1 | 2/2013 | Bicerano |
| 2013/0048365 A1 | 2/2013 | Kim et al. |
| 2013/0065800 A1 | 3/2013 | McDaniel et al. |
| 2013/0081812 A1 | 4/2013 | Green et al. |
| 2013/0095276 A1 | 4/2013 | Dave et al. |
| 2013/0164449 A1 | 6/2013 | Tadepalli et al. |
| 2013/0178568 A1 | 7/2013 | Meuler et al. |
| 2013/0184381 A1 | 7/2013 | Bilodeau et al. |
| 2013/0186624 A1 | 7/2013 | McCrary et al. |
| 2013/0203917 A1 | 8/2013 | Harris et al. |
| 2013/0233545 A1 | 9/2013 | Mahoney et al. |
| 2013/0312974 A1 | 11/2013 | McClung, IV |
| 2014/0060826 A1 | 3/2014 | Nguyen |
| 2014/0060831 A1 | 3/2014 | Miller |
| 2014/0060832 A1 | 3/2014 | Mahoney et al. |
| 2014/0116698 A1 | 5/2014 | Tang et al. |
| 2014/0144631 A1 | 5/2014 | Weaver et al. |
| 2014/0162911 A1 | 6/2014 | Monastiriotis et al. |
| 2014/0262247 A1 | 9/2014 | Duenckel et al. |
| 2014/0274819 A1 | 9/2014 | McCrary et al. |
| 2014/0305650 A1 | 10/2014 | Song et al. |
| 2014/0338906 A1* | 11/2014 | Monastiriotis ........... C09K 8/68 166/280.2 |
| 2015/0034314 A1 | 2/2015 | Hudson et al. |
| 2015/0119301 A1 | 4/2015 | McDaniel et al. |
| 2015/0175750 A1 | 6/2015 | Hopkins et al. |
| 2015/0196940 A1 | 7/2015 | Aizenberg et al. |
| 2015/0203745 A1 | 7/2015 | McDaniel et al. |
| 2015/0259592 A1 | 9/2015 | McDaniel et al. |
| 2015/0315459 A1 | 11/2015 | McDaniel et al. |
| 2015/0322335 A1 | 11/2015 | Lawrence |
| 2016/0137904 A1 | 5/2016 | Drake et al. |
| 2016/0177129 A1 | 6/2016 | McCarthy et al. |
| 2016/0194556 A1 | 7/2016 | McDaniel et al. |
| 2016/0215208 A1 | 7/2016 | Monastiriotis et al. |
| 2016/0251803 A1 | 9/2016 | Tuteja et al. |
| 2016/0333258 A1 | 11/2016 | Drake et al. |
| 2016/0333259 A1 | 11/2016 | Monastiriotis et al. |
| 2016/0333260 A1 | 11/2016 | Drake et al. |
| 2016/0376496 A1 | 12/2016 | Gershanovich et al. |
| 2017/0015835 A1 | 1/2017 | Aizenberg et al. |
| 2017/0015892 A1 | 1/2017 | Nguyen et al. |
| 2018/0119005 A1 | 5/2018 | Drake et al. |
| 2018/0134946 A1 | 5/2018 | McDaniel |
| 2018/0134949 A1 | 5/2018 | Monastiriotis et al. |
| 2018/0148636 A1 | 5/2018 | Monastiriotis et al. |
| 2018/0230363 A1 | 8/2018 | McDaniel |
| 2019/0126314 A1 | 5/2019 | Monastiriotis et al. |
| 2019/0249077 A1 | 8/2019 | McDaniel et al. |
| 2019/0249078 A1 | 8/2019 | McDaniel et al. |
| 2021/0403801 A1 | 12/2021 | Monastiriotis et al. |

FOREIGN PATENT DOCUMENTS

| | | |
|---|---|---|
| CA | 2163972 C | 5/2007 |
| CA | 2574808 C | 12/2010 |
| CA | 2858920 A1 | 6/2013 |

(56) References Cited

FOREIGN PATENT DOCUMENTS

| | | |
|---|---|---|
| CN | 1149007 A | 5/1997 |
| CN | 101641211 A | 2/2010 |
| CN | 103889706 A | 6/2014 |
| DE | 102010051817 A1 | 5/2012 |
| EP | 0207668 A1 | 1/1987 |
| EP | 0544303 A3 | 9/1993 |
| EP | 0690073 A1 | 1/1996 |
| EP | 2440630 A1 | 4/2012 |
| EP | 2469020 A1 | 6/2012 |
| GB | 1294017 A | 10/1972 |
| IN | 102203211 B | 12/2013 |
| MX | 2013012807 A | 8/2014 |
| WO | 2001033039 A1 | 5/2001 |
| WO | 2005075551 A1 | 8/2005 |
| WO | 2005121272 A1 | 12/2005 |
| WO | WO-2009112296 A1 * | 9/2009 ............. C11D 3/124 |
| WO | 2010049467 A1 | 5/2010 |
| WO | 2013048365 A1 | 4/2013 |
| WO | 2013112251 A1 | 8/2013 |
| WO | 2013158306 A1 | 10/2013 |
| WO | 2014052459 A1 | 4/2014 |
| WO | 2014144464 A2 | 9/2014 |
| WO | 2015066283 A1 | 5/2015 |
| WO | 2015073292 A1 | 5/2015 |
| WO | 2016144361 A1 | 9/2016 |
| WO | 2016176350 A1 | 11/2016 |
| WO | 2016183322 A1 | 11/2016 |

OTHER PUBLICATIONS

Non-final Office Action dated Sep. 8, 2017 in U.S. Appl. No. 14/713,235.
Notice of Allowance dated Sep. 12, 2017 in U.S. Appl. No. 15/073,840.
Final Office Action dated Oct. 24, 2017 U.S. Appl. No. 15/461,694.
Nonfinal Office Action dated Oct. 4, 2017 received in U.S. Appl. No. 13/897,288.
Non-final Office Action dated Nov. 24, 2017 in U.S. Appl. No. 15/070,819.
Tambodi et al. "Crosslinked polyethylene", Indian J. Chem. Technol., (2004) vol. 11, pp. 853-864.
Non-final Office Action dated Jan. 19, 2018 in U.S. Appl. No. 15/345,283.
Nonfinal Office Action mailed Mar. 16, 2018 in U.S. Appl. No. 14/713,236.
Final Office Action dated Mar. 15, 2018 in U.S. Appl. No. 14/798,774.
Final Office Action dated Jan. 18, 2018 in U.S. Appl. No. 14/528,070.
Notice of Allowance dated May 17, 2018 in U.S. Appl. No. 15/461,694.
Nonfinal Office Action dated Jun. 21, 2018 received in U.S. Appl. No. 15/153,099.
Non-final Office Action dated Jun. 26, 2018 in U.S. Appl. No. 15/709,781.
Final Office Action dated Jul. 6, 2018 in U.S. Appl. No. 15/070,819.
Notice of Allowance dated Aug. 6, 2018 in U.S. Appl. No. 13/897,288.
Non-Final Office Action dated Feb. 4, 2019 in U.S. Appl. No. 15/070,819.
Final Office Action dated Mar. 19, 2019 in U.S. Appl. No. 15/153,099.
Non-final Office Action dated Sep. 13, 2018 in U.S. Appl. No. 14/673,340.
Final Office Action dated Apr. 12, 2019 in U.S. Appl. No. 14/673,340.
Final Office Action dated Jul. 10, 2019 in U.S. Appl. No. 15/823,699.
Non-Final Office Action dated Jul. 25, 2019 in U.S. Appl. No. 14/928,379.
Non-final Office Action dated Jul. 18, 2019 in U.S. Appl. No. 15/572,877.
Notice of Allowance dated Sep. 12, 2019 in U.S. Appl. No. 15/070,819.
Notice of Allowance dated Dec. 18, 2019 in U.S. Appl. No. 15/153,099.
U.S. Appl. No. 61/898,324, filed Oct. 31, 2013, which is a continuation of U.S. Appl. No. 61/898,324, filed Oct. 31, 2013, which is a continuation of U.S. Appl. No. 61/898,324, filed Oct. 31, 2013, which claims priority from U.S. Appl. No. 61/898,324, filed Oct. 31, 2013, and U.S. Appl. No. 61/898,324, filed Oct. 31, 2013.
U.S. Appl. No. 62/072,479, filed Oct. 30, 2014, which claims priority to U.S. Appl. No. 62/072,479, filed Oct. 30, 2014, and U.S. Appl. No. 62/072,479, filed Oct. 30, 2014.
U.S. Appl. No. 62/107,060, filed Jan. 23, 2015, which claims priority to U.S. Appl. No. 62/107,060, filed Jan. 23, 2015.
U.S. Appl. No. 62/160,649, filed May 13, 2015, which claims priority to U.S. Appl. No. 62/160,649, filed May 13, 2015.
U.S. Appl. No. 13/099,893, filed May 3, 2011, which is a continuation of U.S. Appl. No. 13/099,893, filed May 3, 2011, now U.S. Pat. No. 8,993,489.
U.S. Appl. No. 13/099,893, filed May 3, 2011, which is a continuation of U.S. Appl. No. 13/099,893, filed May 3, 2011, which is a continuation of U.S. Appl. No. 13/099,893, filed May 3, 2011, now U.S. Pat. No. 9,040,467, which is a continuation-in-part of U.S. Appl. No. 13/099,893, filed May 3, 2011, now U.S. Pat. No. 8,993,489.
U.S. Appl. No. 13/099,893, filed May 3, 2011 which is a continuation of U.S. Appl. No. 13/099,893, filed May 3, 2011, now U.S. Pat. No. 10,544,358, which is a continuation of U.S. Appl. No. 13/099,893, filed May 3, 2011, now U.S. Pat. No. 9,290,690, which is a continuation-in-part of U.S. Appl. No. 13/099,893, filed May 3, 2011, now U.S. Pat. No. 9,040,467, which is a continuation-in-part of U.S. Appl. No. 13/099,893, filed May 3, 2011, now U.S. Pat. No. 8,993,489.
U.S. Appl. No. 13/099,893, filed May 3, 2011, now U.S. Pat. No. 9,725,645, which is a continuation-in-part of U.S. Appl. No. 13/099,893, filed May 3, 2011, now U.S. Pat. No. 9,290,690, which is a continuation-in-part of U.S. Appl. No. 13/099,893, filed May 3, 2011, now U.S. Pat. No. 9,040,467, which is a continuation-in-part of U.S. Appl. No. 13/099,893, filed May 3, 2011, now U.S. Pat. No. 8,993,489.
U.S. Appl. No. 13/224,726, filed Sep. 2, 2011, now U.S. Pat. No. 10,087,360, which is a continuation of U.S. Appl. No. 13/224,726, filed Sep. 2, 2011, now U.S. Pat. No. 9,624,421, which is a continuation of U.S. Appl. No. 13/224,726, filed Sep. 2, 2011, now U.S. Pat. No. 8,763,700.
U.S. Appl. No. 13/355,969, filed Jan. 23, 2012, now U.S. Pat. No. 9,562,187.
U.S. Appl. No. 13/837,396, filed Mar. 15, 2013, now U.S. Pat. No. 10,208,242, which is a continuation of U.S. Appl. No. 13/837,396, filed Mar. 15, 2013, now U.S. Pat. No. 9,518,214.
U.S. Appl. No. 13/897,288, filed May 17, 2013, which is a continuation of U.S. Appl. No. 13/897,288, filed May 17, 2013, now U.S. Pat. No. 10,100,247.
U.S. Appl. No. 62/160,786, filed May 13, 2015, which is a continuation of U.S. Appl. No. 62/160,786, filed May 13, 2015, now U.S. Pat. No. 9,862,881, which claims priority to U.S. Appl. No. 62/160,786, filed May 13, 2015, U.S. Appl. No. 62/160,786, filed May 13, 2015, U.S. Appl. No. 62/160,786, filed May 13, 2015, U.S. Appl. No. 62/160,786, filed May 13, 2015, and U.S. Appl. No. 62/160,786, filed May 13, 2015.
U.S. Appl. No. 62/160,786, filed May 13, 2015, which is a national stage entry of PCT/US16/32104, filed May 12, 2016, which claims priority to U.S. Appl. No. 62/160,786, filed May 13, 2015, U.S. Appl. No. 62/160,786, filed May 13, 2015, U.S. Appl. No. 62/160,786, filed May 13, 2015, U.S. Appl. No. 62/160,786, filed May 13, 2015, and U.S. Appl. No. 62/160,786, filed May 13, 2015.
U.S. Appl. No. 14/266,179, filed Apr. 30, 2014, which is a continuation of U.S. Appl. No. 14/266,179, filed Apr. 30, 2014, now U.S. Pat. No. 9,790,422.
U.S. Appl. No. 62/160,796, filed May 13, 2015, which claims priority from U.S. Appl. No. 62/160,796, filed May 13, 2015.
U.S. Provisional Application No. 62/264,172, filed Dec. 7, 2015.
U.S. Appl. No. 62/582,567, filed Nov. 7, 2017.
U.S. Appl. No. 62/421,488, filed Nov. 14, 2016, which claims priority from U.S. Appl. No. 62/421,488, filed Nov. 14, 2016.
U.S. Appl. No. 62/422,961, filed Nov. 16, 2016, which claims priority from U.S. Appl. No. 62/422,961, filed Nov. 16, 2016.

(56) References Cited

OTHER PUBLICATIONS

U.S. Appl. No. 62/426,888, filed Nov. 28, 2016, which claims priority from U.S. Appl. No. 62/426,888, filed Nov. 28, 2016.
U.S. Appl. No. 62/580,708, filed Nov. 2, 2017, which claims priority from U.S. Appl. No. 62/580,708, filed Nov. 2, 2017.
U.S. Appl. No. 62/570,206, filed Oct. 10, 2017.
AkzoNobel Declaration of Compliance Bindzil CC401, Eka Chemical, Jan. 27, 2010, pp. 1-4.
AkzoNobel Silane Modified Colloidal Silca Bindzil CC in Waterborne Coating Applications Use and Benefits, 2011, pp. 1-6.
Boster, Ronald S., A Study of Ground-Water Contamination Due to Oil-Field Brines in Morrow and Delaware; Counties, Ohio, With Emphasis on Detection Utilizing Electrical Resistivity Techniques, The Ohio State University,; 1967.
Cao et al., Mesoporous SiO2-supported Pt Nanoparticles for catalytic application, ISRN Nanomaterials, 2013, Article D 745397, 7 pages.
CARBO Ceramics, Topical Reference, Physical Properites of Proppants, 2011, pp. 1-5.
EPA, Oil and Gas Extraction, Compliance and Enforcement History, Sector Notebook Project, Oct. 2000, pp. 115-155.
Halimoon, Removal of heavy metals from textile wastewater using zeolite, Environment Asia, 2010, 3(special issue):124-130.
Hui et al., Removal of mixed heavy metal ions in wasterwater by zeolite 4A and residual products from recycled coal fly ash, Jounal of Hazardous Materials, Aug. 1, 2005, vol. B124, pp. 89-101.
Huntsman, JEFFCAT Amine Catalysts for the Polyurethane Industry, Americas Region, 2010, pp. 1-4.
Huntsman, Performance Products, JEFFCAT catalysts for the polyurethane industry, Asia Pacific, 2010, pp. 1-6.
Huntsman, The JEFFAMINE Polyetheramines, 2007.
International Search Report and Written Opinion issued in PCT/US2012/036093 dated Aug. 14, 2012.
International Search Report and Written Opinion issued in PCT/US2012/047519 dated Nov. 2, 2012.
International Search Report and Written Opinion issued in PCT/US2012/053277 dated Nov. 20, 2012.
International Search Report issued in PCT/US2012/070844 dated Mar. 8, 2013.
Interstate Oil and Gas Compact Commission and ALL Consulting, A Guide to Practical Management of Produced; Water from Onshore Oil and Gas Operations in the United States, Oct. 2006.
Kuang et al., Controllable fabrication of SnO2-coated multiwalled carbon nanotubes by chemical vapor deposition, Carbon 2006 44(7):1166-1172.
Madaan and Tyagi, Quaternary pryidinium salts: a review, J Oleo Sci 2008 57(4):197-215.
Mellaerts et al., Enhanced release of itraconazole from ordered mesoporous SBA-15 silica materials, Chem Commun 2007 7(13):1375-7.
Notice of Allowance dated Dec. 22, 2015 in U.S. Appl. No. 13/626,055.
Official Action datd Nov. 30, 2015 from U.S. Appl. No. 14/798,774.
Polyurethanes, Ullmann's Encyclopedia of Industrial Chemistry, 2012, vol. 29.
Sanchez, Mariano, FRAC Packing: Fracturing For Sand Control, Middle East and Asia Reservoir Review, Nov. 8, 2007, pp. 37-49.
The removal of heavy metals cations by natural zeolites; retrieved from the internet http://www.resultsrna.com/research/zeolite_binds_heavy_metals.php; Aug. 31, 2011.
Wikipedia, ion-exchange resin, en.wikipedia.org/wikillon_exchange_resins, pp. 1-5.
Wikipedia, Methylene diphenyl diisocyanate, retrieved from the internet http://en.wikipedia.org/wiki/Methylene_diphenyl_diisocyanate; Jul. 21, 2011.
Wikipedia, Piezoelectricity, en.wikipedia.org.wiki/Piezoelectricity, pp. 1-15.
Wingenfelder et al., Removal of heavy metals from mine waters by natural zeolites, Environ Sci Technol, 2005, 39:4606-4613.
Non-Final Office Action dated Mar. 18, 2016 in U.S. Appl. No. 13/355,969.
Non-Final Office Action dated Apr. 5, 2016 in U.S. Appl. No. 14/314,573.
Non-Final Office Action dated Apr. 5, 2016 in U.S. Appl. No. 13/897,288.
Final Office Action dated Apr. 29, 2016 in U.S. Appl. No. 14/798,774.
Final Office Action dated May 3, 2016 in U.S. Appl. No. 14/266,179.
Final Office Action dated May 27, 2016 in U.S. Appl. No. 13/837,396.
Notice of Allowance dated Aug. 8, 2016 in U.S. Appl. No. 13/837,396.
Non-Final Office Action dated Aug. 25, 2016 in U.S. Appl. No. 15/073,840.
Sigma-Aldrich, "Polybutadiene, hydroxyl terminated" Jun. 8, 2014, https://web.archive.org/web/20140608155646/http:product/alddrich/190799?lang=en&region=).
Chemicalland21, "Lauryl alcohol ethoxylates" Mar. 18, 2006, https://web.archive.org/web/20060318023334/http://www.chemicalland21.com/specialtychem/perchem/LAURYL%20ALCOHOL%20ETHOXYLATE.htm.
Ramirez et al., Synthesis of crosslinked and functionalized polystyrene by miniemulsion polymerization: particle size control, Macromex 2014.
Notice of Allowance dated Oct. 31, 2016 in U.S. Appl. No. 13/355,969.
Notice of Allowance dated Nov. 9, 2016 in U.S. Appl. No. 14/015,629.
Non-final Office Action dated Dec. 6, 2016 in U.S. Appl. No. 14/673,340.
Notice of Allowance dated Dec. 8, 2016 in U.S. Appl. No. 14/314,573.
Dewprashad et al., Modifying the proppant surface to enhance fracture condictivity, Society of Petroleum Engineers 1999 SPE50733.
Weaver et al., Sustaining Conductivity, Society of Petroleum Engineers 2006 SPE98236.
Samuel et al., Gelled Oil: new chemistry using surfactants, SPE International 2005 SPE 97545.
Momentive Safety Data Sheet, 2015.
Final Office Action dated Jan. 4, 2017 in U.S. Appl. No. 13/897,288.
Non-final Office Action dated Feb. 17, 2017 in U.S. Appl. No. 14/713,235.
Non-final Office Action dated Apr. 27, 2017 in U.S. Appl. No. 15/073,840.
Final Office Action dated Mar. 11, 2022 in U.S. Appl. No. 16/906,020.
Non-Final Office Action dated Jun. 6, 2022 issued in U.S. Appl. No. 17/366,895.
DOW Epoxy Resin Product Data Sheet, downloaded Jun. 10, 2021.
Final Office Action dated Feb. 24, 2020 in U.S. Appl. No. 15/572,877.
Final Office Action dated Jul. 6, 2021 issued in U.S. Appl. No. 16/906,020.
Final Office Action, dated Aug. 2, 2021, issued in U.S. Appl. No. 16/130,290.
Final Office Action, dated Jan. 1, 2021, issued in U.S. Appl. No. 16/124,742.
Final Office Action, dated Jan. 7, 2022, issued in U.S. Appl. No. 16/801,380.
Momentive Technical Data Sheet, Revised 2019.
Non-Final Office Action dated Apr. 2, 2020 in U.S. Appl. No. 16/124,742.
Non-final Office Action dated Apr. 29, 2020 in U.S. Appl. No. 15/810,533.
Non-Final Office Action dated Jan. 6, 2021 issued in U.S. Appl. No. 15/572,877.
Non-Final Office Action dated Jun. 25, 2021 issued in U.S. Appl. No. 15/572,877.
Non-Final Office Action dated Mar. 19, 2020 in U.S. Appl. No. 15/837,370.
Non-Final Office Action, dated Jan. 6, 2021, issued in U.S. Appl. No. 15/810,533.
Non-Final Office Action, dated Mar. 16, 2021, issued in U.S. Appl. No. 16/130,290.
Non-Final Office Action, dated Nov. 22, 2021, issued in U.S. Appl. No. 16/713,436.
Notice of Allowance, dated Aug. 18, 2021, issued in U.S. Appl. No. 15/810,533.

(56) References Cited

OTHER PUBLICATIONS

Notice of Allowance dated Feb. 24, 2020 in U.S. Appl. No. 15/823,699.
Notice of Allowance, dated May 24, 2021, issued in U.S. Appl. No. 16/124,742.
Final Office Action, dated Jan. 12, 2022, issued in U.S. Appl. No. 15/572,877.
Non-Final Office Action dated Feb. 22, 2022 Issued in U.S. Appl. No. 16/130,290.
International Search Report and Written Opinion from PCT/US21/63080.
Non-Final Office Action dated Aug. 18, 2022 received in U.S. Appl. No. 17/371,974.

* cited by examiner

CONTINUOUS MIXERS AND METHODS OF USING THE SAME

CROSS-REFERENCE TO RELATED APPLICATIONS

This application claims priority under 35 U.S.C. § 119 to U.S. Provisional Application No. 62/580,708, filed Nov. 2, 2017, which is hereby incorporated by reference in its entirety.

FIELD

The disclosure generally refers to a mixer for producing coated particles, such as proppants used in hydraulic fracturing techniques.

BACKGROUND

Coated particles, known as proppants, are often used in hydraulic well fracturing to increase production rate of the well. Currently particle coatings are known in the art, and often comprise one or more layers of chemical reaction products. Mixing the chemical products with uncoated particles often involves various mixers, for example agitation mixers, drum mixers, tubular mixers, or conical mixers. Mixing can also be carried out on a continuous basis, where coating agents can be continuously added to heated particles during the coating process. However, quickly and effectively coating particles with high throughputs continues to be challenging. Thus, there is a need for improved mixers for coating particles.

SUMMARY

The present disclosure relates to a method of producing coated particles comprising: heating particles to a first temperature; feeding the particles into an inlet of a first mixer comprising an outer wall and at least one auger comprising a rotating shaft and a plurality of paddles connected thereto, wherein the at least one auger of the first mixer is rotating at a rate capable of moving the particles into an annulus positioned along the outer wall and moving the particles towards an outlet of the first mixer; feeding a first coating composition into a first dosing port of the first mixer, wherein the first coating composition mixes with the particles in the annulus, and wherein the coating composition coats the particles as they move towards the outlet; and collecting the coated particles as the coated particles are discharged from the outlet. In some embodiments, the particles are not heated or are introduced into the mixer at a temperature of less than 100 degrees.

In some embodiments, the chemicals or compositions that are used to coat the particles are not heated before being put in contact with the particles. In some embodiments, chemicals or compositions In some embodiments, the at least one auger rotates at a rate of about 300 rotations per minute (RPM) to about 1200 RPM. In some embodiments, the particles move from the inlet to the outlet in an average time from about 2 seconds to about 15 seconds. In some embodiments, the particles are discharged from the outlet at an average rate of about 100 pounds per minute to about 6000 pounds of particles per minute. In some embodiments, the particles are discharged from the outlet at an average rate of about 3 tons per hour to about 180 tons per hour.

In some embodiments, the first mixer further comprises at least a second dosing port. In some embodiments, the method further comprises feeding a second coating composition into one or more dosing ports of the first mixer, wherein the second coating composition is the same or different than the first coating composition.

In some embodiments, the method further comprises heating the first coating composition or the second coating composition above their melting point prior to the step of feeding the coating compositions into one or more dosing ports of the first mixer. In some embodiments, the first temperature is greater than the melting point of the coating compositions. In some embodiments, the coating composition is not heated. In some embodiments, the coating composition is not heated before coming into contact with the particles. The coating composition or chemicals that are used to coat the particles can be heated by the coming into contact with sand that has been heated to a temperature of about 190 to about 220 degrees, but the chemicals or coating compositions are not heated by themselves.

In some embodiments, the method further comprises the step of feeding at least a first gas into one or more dosing ports of the first mixer, wherein the gas is capable of being mixed or reacted with the particles or filling a space in the center of the particle annulus in the first mixer. In some embodiments, the at least a first gas comprises one or more of air, oxygen, nitrogen, carbon dioxide, or catalysts that can be used to coat the particles. In some embodiments, the step of feeding at least a first gas into the first mixer takes place before the step of feeding the particles into the inlet of the first mixer. In some embodiments, the gas is optionally heated to at least a second temperature before the gas is fed into the first mixer. In some embodiments, the second temperature is greater than the first temperature. In some embodiments, the second temperature is less than the first temperature.

In some embodiments, the method further comprises at least a second mixer arranged in serial with the first mixer, such that particles exiting the outlet of the first mixer then enter into an inlet of the second mixer. In some embodiments, the method further comprises at least a third mixer arranged in serial with the second mixer, such that particles exiting the outlet of the second mixer then enter into an inlet of the third mixer.

In some embodiments, the method further comprises, at least a second mixer arranged in parallel with the first mixer, such that particles are fed into the inlet of the first mixer at or approximately at the same time as particles are fed into an inlet of the second mixer. In some embodiments, the method further comprises the steps of: heating the particles to a first temperature in a container; feeding the particles from the container into the inlet of the first mixer and the inlet of the second mixer, such that particles are fed into the inlet of the first mixer at or approximately at the same time as particles are fed into the inlet of the second mixer. In some embodiments, half or approximately half of the particles are fed into each mixer.

DETAILED DESCRIPTION

Figure 1:
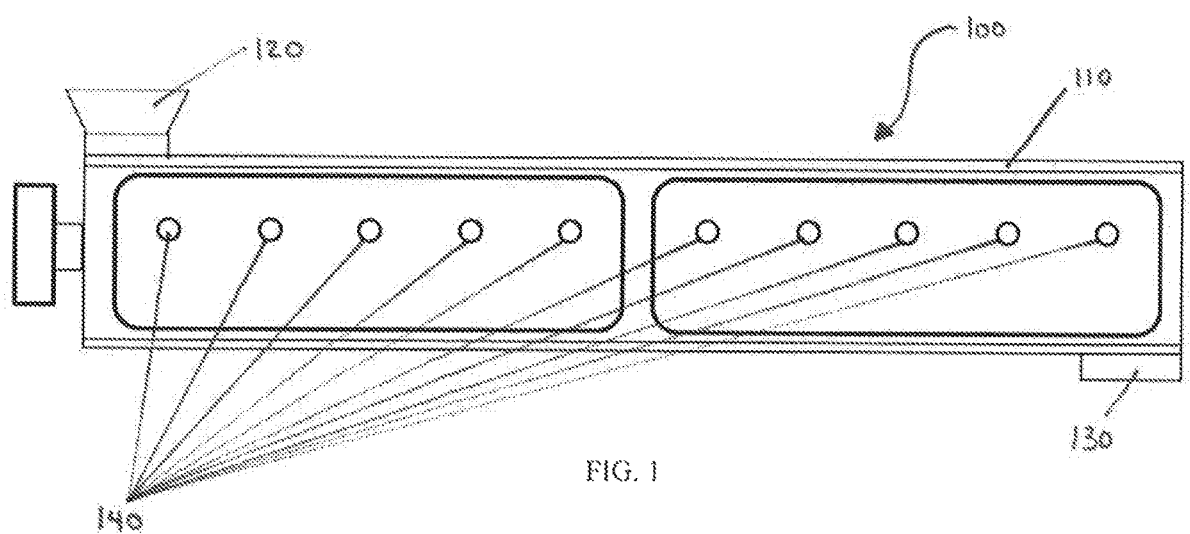
FIG. 1 depicts a side-view of some embodiments of a mixer, showing, for example, an inlet, an outlet, and multiple dosing ports.

This disclosure is not limited to the particular devices, mixers, processes, compositions, or methodologies described herein, as these may vary. It will be apparent that various modifications can be made without departing from the scope of the disclosure as defined in the accompanying claims.

Various publications, including patents, published applications, technical articles and scholarly articles are cited throughout the specification. Each of these cited publications and patent applications is incorporated by reference herein in its entirety.

Various terms relating to the systems and methods of the present disclosure are used throughout the specification and claims. Such terms are to be given their ordinary meaning in the art unless otherwise indicated. Other specifically defined terms are to be construed in a manner consistent with the definitions provided herein.

As used herein, the singular forms "a," "an," and "the" include plural referents unless the content clearly dictates otherwise.

As used herein, the term "more than 2" means any whole integer greater than the number two, e.g. 3, 4, or 5.

As used herein, the term "plurality" means any amount or number greater than 1.

As used herein, the terms "upward" and "downward" are orientations relative to the ground or operating surface as are any references to "horizontal" or "vertical" planes.

As used herein, the term "about" when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

As used herein, the term "information" refers to data values attributed to parameters. In some embodiments, information is digital and/or analog information.

As used herein, the terms "processing," "computing," "calculating," "determining," or the like, refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The present disclosure provides, in some embodiments, a continuous mixer system and methods for producing coated particles. Mixers disclosed herein comprise an inlet into and an outlet from a mixing chamber and an auger that runs the length of the mixer. In some embodiments, the auger comprises a series of paddles affixed to the auger, such as in the center of the mixing chamber. In some embodiments, the rotation of the auger comprising the paddles is configured to push, or form the, particles into an annulus along the interior wall of the mixing chamber. Without being bound to any particular theory, the rotational force and/or the orientation of the paddles in relation to the horizontal axis of the auger can also move (or push) the particles towards the outlet. In some embodiments, one or more dosing ports are positioned along length of the mixer. The ports can be used to inject, or feed, chemical compositions and/or gas to enter into the mixing chamber at various locations. The chemical compositions can be used to coat particles that are introduced into the mixer through the inlet and then discharged as coated particles through the outlet.

Methods are also provided disclosed herein comprise heating particles to a desired temperature, then feeding the particles into the inlet of one or more mixers. In some embodiments, the particles are not heated. In some embodiments, the particles are introduced into the mixer at a temperature of about 70 to about 300 degrees Fahrenheit. In some embodiments, the particles are not heated. In some embodiments, the particles are introduced into the mixer at a temperature of about 70 to about 80 degrees Fahrenheit. In some embodiments, the particles are introduced into the mixer at a temperature of about 175 to about 275 degrees Fahrenheit. In some embodiments, the particles are introduced into the mixer at a temperature of about 185 to about 260 degrees Fahrenheit. In some embodiments, the temperature of the particles are about 190 to about 220 degrees Fahrenheit. The particles can be pre-heated or heated inside of the mixer.

In some embodiments, the rotation of the auger moves the particles into an annulus along the outer wall of the mixer, and the particles move towards the outlet. While the particles are traveling through the mixing chamber, coating compositions are feed into the mixer via one or more dosing ports, and the coating composition coats the particles as they move towards the mixer outlet. One or more mixers can be used in a serial, parallel, or combination arrangement to obtain the desired coated particle output.

In some embodiments, the chemicals or compositions that are used to coat the particles are not heated before being put in contact with the particles. In some embodiments, chemicals or compositions. The mixers provided for herein can be used with any variety of chemicals or compositions, such as silanes, polyol, and isocyanates. The mixer can be used with other coatings as well that are suitable for being used in a mixer. In some embodiments, the coatings, chemicals, or components are suitable for being injected under pressure into the mixer. In some embodiments, the chemicals are introduced into the mixer in a port that is different from the inlet that the particles are introduced into the mixer.

Non-limiting examples of chemicals that can be used with the mixer include, but are not limited to, Isocyanates: Rubinate 1820 (Huntsman), Rubinate M (Huntsman), Rubinate 9257 (Huntsman), M70L (BASF), M20 (BASF), PAPI 27 (The Dow Chemical Company), ISONATE (The Dow Chemical Company), PAPI 580N (The Dow Chemical Company), TERAFORCE HF-459 (The Dow Chemical Company), TERAFORCE 17557 (The Dow Chemical Company) and mixtures thereof; Polyols: Jeffol FX31-240 (Huntsman), Jeffol G30-400 (Huntsman), Jeffol G30-650 (Huntsman), Jeffol A-630 (Huntsman), Pluracol GP 430 (BASF), Pluracol TP 440 (BASF), Pluracol PEP 450 (BASF), Pluracol P410R (BASF), Pluracol P710R (BASF), Pluracol 858 (BASF), Pluracol PEP 550 (BASF), Pluracol Quadrol PM (BASF), Pluracol 1578 (BASF), VORANOL 220-260 (The Dow Chemical Company), VORANOL 225 (The Dow Chemical Company), VORANOL 230-660 (The Dow Chemical Company), VORANOL 270 (The Dow Chemical Company), VORANOL 8150 (The Dow Chemical Company), XUS 420 (The Dow Chemical Company), TP 39045 (The Dow Chemical Company), TP 92576 (The Dow Chemical Company), TERAFORCE 62575 (The Dow Chemical Company), TERAFORCE 0801-X (The Dow Chemical Company) and mixtures thereof. These can also be combined with silanes or other chemicals as described or claimed in U.S. Pat. Nos. 9,040,467, 9,290,690, 9,862,881 or U.S. application Ser. Nos. 14/528,070, 14/798,774 or PCT Application No. PCT/US2014/063086, each of which is incorporated by reference in its entirety. The coatings provided for in these referenced patents, applications or publications can be mixed and applied to the particles with these mixers.

FIG. 1 depicts an exterior view of some embodiments of a representative mixer (100). The mixer comprises a tubular outer wall (110). The mixer (100) has an inlet (120) and an outlet (130) that allows for the introduction and discharge of any particulates (not shown) from the mixer chamber (not shown). In general, uncoated or partially coated particles are fed into the inlet (120) and are discharged from the outlet (130). Along the outside of the outer wall (110) are one or more dosing ports (collectively 140), however, ports depicted are for illustration purposes only and the mixer can have fewer or more ports as described herein. As a non-limiting example, the mixer depicted in FIG. 1 has twenty dosing ports, ten are shown, and another ten positioned on the other side of the mixer, which are not shown.

Figure 2:
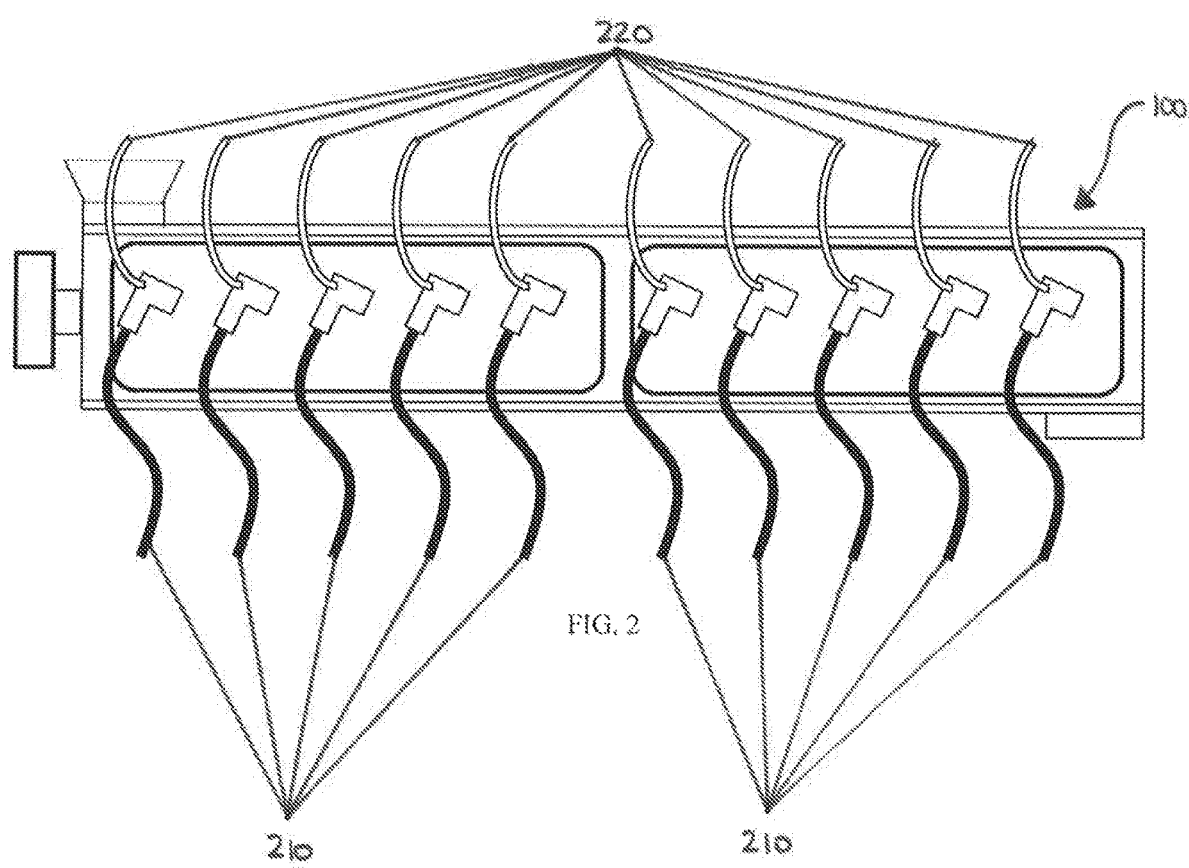
FIG. 2 depicts a side-view of some embodiments of a mixer showing multiple chemical and/or gas feed lines operably connected to the dosing ports.

FIG. 2 depicts a mixer (100), comprising multiple (collectively 210) and (collectively 220) feed lines that are attached to the dosing ports (not shown). The lines can be used for injecting or feeding gas and/or chemicals (e.g. coating compositions) into the mixing chamber (not shown) The feed lines allow for the gas, coating compositions, and/or other reagents to be fed or injected into the mixing chamber through the dosing ports. In some embodiments, the feed lines (210) allow individual chemicals or combinations of chemicals to be fed into the mixer (100) at various points. In some embodiments, the feed lines (220) allow one or more gasses to be fed into the mixer (100) at various points. In some embodiments, 1, 2, 3, 4, 5, 6, 7, 8, 9, 10, 11, 12, 13, 14, 15, 16, 17, 18, 19, or 20 of the feed lines and dosing ports are used simultaneously or approximately simultaneously during the coating of particles in the mixer. FIG. 2 also depicts an inlet (120) and an outlet (130). The feed lines described herein can also be used to introduce a catalyst either by itself or in a mixture with another chemical or composition. The catalysts can be used, for example, to produce a polyurethane coating made from a polyol and an isocyanate.

Figure 3:
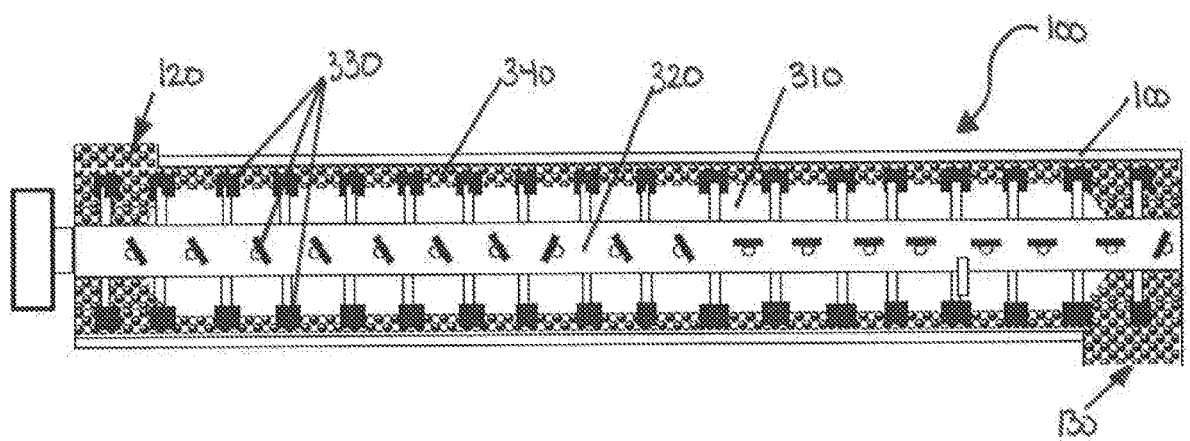
FIG. 3 depicts a cross-section side-view of some embodiments of a mixer, depicting an auger, and attached paddles.

FIG. 3 depicts a cross-section of the mixer (100), as if a part of the outer wall (110) has been removed with the interior mixing chamber (310) visible. An auger (320) runs the length of the mixing chamber (310) and is turned by a motor (350), here shown positioned near the inlet (110). However, the position of the motor could be moved and is not critical. A series of paddles (collectively 330) are affixed to and around the auger (320) are a series of paddles (collectively 330). Each paddle (330) can be positioned with an orientation from about −45 degrees to about +45 degrees in relation to the horizontal axis of the auger (320). In some embodiments, each paddle (330) has an orientation of exactly −45 degrees, 0 degrees, or +45 degrees. In some embodiments, the plurality of the paddles are oriented at −45 degrees. In some embodiments, the plurality of the paddles are oriented at 0 degrees. In some embodiments, the plurality of the paddles are oriented at +45 degrees.

In some embodiments, the paddles of the first mixer are grouped into an inlet zone, a middle zone, and an outlet zone. In some embodiments, each zone is approximately equal to one-third of the length of the mixing chamber. In some embodiments, the paddles in the inlet zone are oriented randomly at either −45 degrees, 0 degrees, or +45 degrees. In some embodiments, a plurality of the paddles in the inlet zone are oriented at −45 degrees. In some embodiments, all of the paddles in the inlet zone are oriented at −45 degrees. In some embodiments, a plurality of the paddles in the inlet zone are oriented at 0 degrees. In some embodiments, all of the paddles in the inlet zone are oriented at 0 degrees. In some embodiments, a plurality of the paddles in the inlet zone are oriented at +45 degrees. In some embodiments, all of the paddles in the inlet zone are oriented at +45 degrees. In some embodiments, the paddles in the middle zone are oriented randomly at either −45 degrees, 0 degrees, or +45 degrees. In some embodiments, a plurality of the paddles in the middle zone are oriented at −45 degrees. In some embodiments, all of the paddles in the middle zone are oriented at −45 degrees. In some embodiments, a plurality of the paddles in the middle zone are oriented at 0 degrees. In some embodiments, all of the paddles in the middle zone are oriented at 0 degrees. In some embodiments, a plurality of the paddles in the middle zone are oriented at +45 degrees. In some embodiments, all of the paddles in the middle zone are oriented at +45 degrees. In some embodiments, the paddles in the outlet zone are oriented randomly at either −45 degrees, 0 degrees, or +45 degrees. In some embodiments, a plurality of the paddles in the outlet zone are oriented at −45 degrees. In some embodiments, all of the paddles in the outlet zone are oriented at −45 degrees. In some embodiments, a plurality of the paddles in the outlet zone are oriented at 0 degrees. In some embodiments, all of the paddles in the outlet zone are oriented at 0 degrees. In some embodiments, a plurality of the paddles in the outlet zone are oriented at +45 degrees. In some embodiments, all of the paddles in the outlet zone are oriented at +45 degrees.

Also depicted in FIG. 3 are particles that have been introduced (340) into the mixing chamber (310). Upon entering the inlet (120), the particles (340) form an annulus in the mixing chamber (310) due to the rotation of the auger (320) and the paddles (330). The particles (340) will move down the mixing chamber (310) towards the outlet (130), where they will exit the mixer (100).

Figure 4:
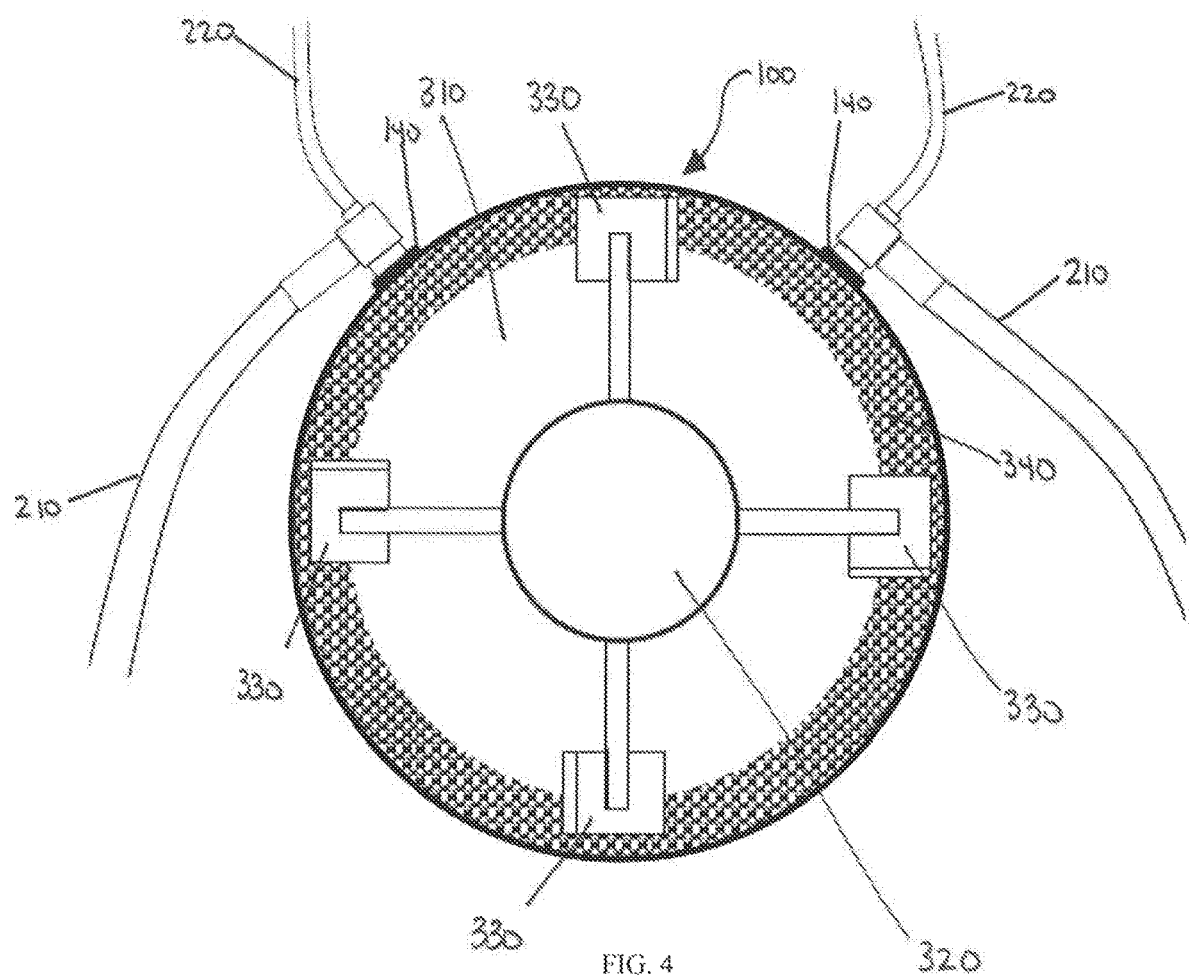
FIG. 4 depicts a cross-section end-view of some embodiments of a mixer, depicting an auger and particle annulus.

FIG. 4 depicts another cross-section of the mixer (100), showing the auger (320) and paddles (330) in the center of the mixing chamber (310). The particles (340) have formed an annulus around the auger (320). Also depicted are two dosing ports (collectively 140) on either side of the mixer (100). Multiple feed lines (210) and feed line (220) are attached to each dosing port (140). In some embodiments, chemicals and/or gasses fed into the mixer (100) via one or more dosing ports (140) are able to efficiently mix with the particles (340) in the annulus, as the particles (340) are in direct contact with the dosing ports (140) along the edge of the mixing chamber (310). The mixing action of the auger and gas being injected into the mixer are used to coat the particles.

Figure 5:
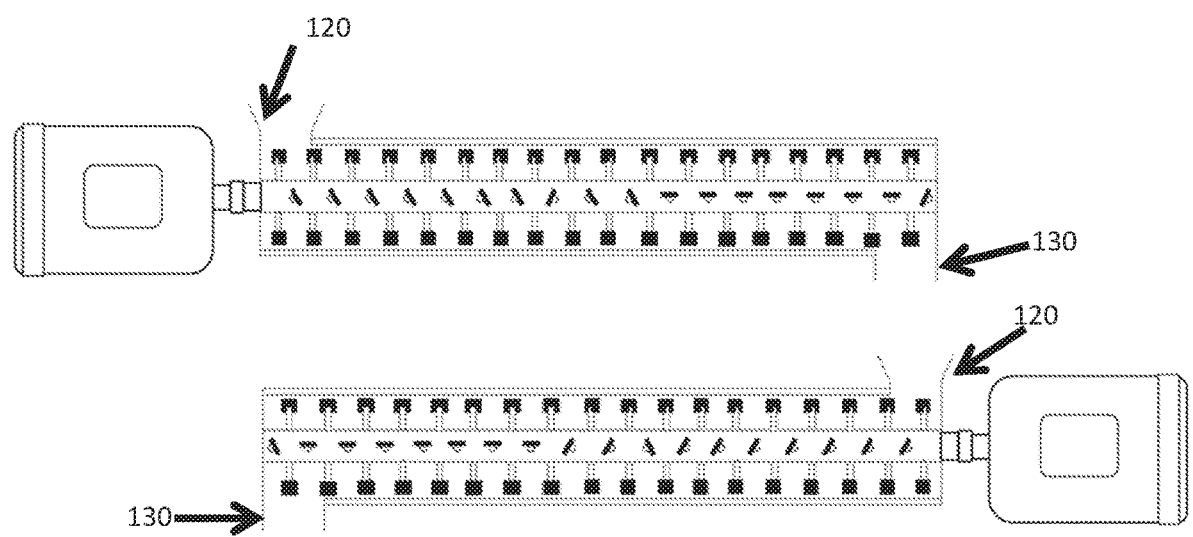
FIG. 5 depicts a cross-section side-view of some embodiments of multiple mixers in serial.

FIG. 5 depicts a cross-section of multiple mixers, similarly as depicted in FIG. 3, connected in serial. Upon entering the inlet (120) the particles can be mixed and coated and exit the first mixture through an outlet (130), where they will enter into the second mixer through the inlet (120) and be processed and leaving through the outlet (130) of the second mixer.

as if a part of the outer wall has been removed with the interior mixing chamber visible. The two mixers illustrate a non-limiting embodiment of two mixers (100) connected in serial where the particles processed in one are discharged into another mixer (100) so that chemicals can be introduced with the particles in this manner.

In some embodiments, any of the mixers described herein can used as a single unit or in combination with multiple units. In some embodiments, at least a second mixer can be arranged in serial with a first mixer, such that particles exiting the outlet of the first mixer then enter into an inlet of the second mixer. In some embodiments, at least a third mixer arranged in serial with the second mixer, such that particles exiting the outlet of the second mixer then enter into an inlet of the third mixer. In some embodiments, there is no limit as to the number of mixers that can be arranged in serial.

In some embodiments, multiple mixers can be arranged in parallel with each other. In some embodiments, at least a second mixer arranged in parallel with a first mixer, such that particles are fed into the inlet of the first mixer at or approximately at the same time as particles are fed into an inlet of the second mixer. In some embodiments, particles to be fed into mixers arranged in parallel can be stored in a container, then fed into the inlets of the first and second mixers at or approximately at the same time. In some embodiments, half or approximately half of the particles are fed into each mixer. In some embodiments, there is no limit as to the number of mixers that can be arranged in parallel.

In some embodiments, combinations of parallel and series arrangements are possible. In some embodiments, a first and a second mixer are arranged in parallel, while a third mixer is arranged in series with the first mixer, such that particles exiting the outlet of the first mixer then enter into an inlet of the third mixer, and a fourth mixer is arranged in series with the second mixer, such that particles exiting the outlet of the second mixer then enter into an inlet of the fourth mixer. In some embodiments, there is no limit as to the number of mixers that can be used in a combination of parallel and series arrangements.

In some embodiments, any of the mixers described herein comprise one or more controllers. In some embodiments, a controller of a mixer will be in electronic communication with the motor. In some embodiments, a controller of a mixer will be in electronic communication with one or more dosing ports. In some embodiments, a controller of a mixer will be in electronic communication with a control panel configured to convey information to and/or receive information from an operator.

In some embodiments, any of the mixers or mixer combinations described herein can be used in methods for producing coated particles. In some embodiments, the method comprises heating particles to a first temperature. In some embodiments, the methods comprise feeding the particles into an inlet of a first mixer comprising an outer wall and at least one auger comprising a rotating shaft and a plurality of paddles connected thereto, wherein the at least one auger of the first mixer is rotating at a rate capable of moving the particles into an annulus positioned along the interior of the outer wall of the mixer. The rotational force can, as described herein, be used to move the particles towards an outlet of the first mixer. The rotational force can also be used to discharge the particles from the mixer. In some embodiments, the method comprises injecting a first coating composition into a first dosing port of the first mixer, wherein the first coating composition mixes with the particles in the annulus. The coating composition coats the particles, Without being bound by any theory, the coating composition can coat the particles as they move towards the outlet. In some embodiments, the particles (coated or uncoated) are discharged from the mixer. In some embodiments, the discharged particles (coated or uncoated) are collected The particles can be discharged through the outlet. As described herein, the mixers can be configured serially such that the coated particles or particles that move through the first mixer and then discharged into a second mixer. The second mixer can be used to coat or otherwise mix the particles with additional coating compositions as described herein.

In some embodiments, the particles are heated to an elevated temperature and then contacted (e.g., mixed) with the coating composition. In some embodiments, the particulate is heated to a temperature from about 50° C. to about 150° C. The increased temperature can, for example, accelerate crosslinking reactions in the applied coating.

In some embodiments, the auger rotates at a rate sufficient to push the particles into an annulus in the mixing chamber. In some embodiments, the auger rotates at a rate of about 100 rotations per minute (RPM) to about 2000 RPM. In some embodiments, the auger rotates at a rate of about 200 rotations per minute (RPM) to about 2000 RPM. In some embodiments, the auger rotates at a rate of about 300 rotations per minute (RPM) to about 2000 RPM. In some embodiments, the auger rotates at a rate of about 400 rotations per minute (RPM) to about 2000 RPM. In some embodiments, the auger rotates at a rate of about 500 rotations per minute (RPM) to about 2000 RPM. In some embodiments, the auger rotates at a rate of about 600 rotations per minute (RPM) to about 2000 RPM. In some embodiments, the auger rotates at a rate of about 700 rotations per minute (RPM) to about 2000 RPM. In some embodiments, the auger rotates at a rate of about 800 rotations per minute (RPM) to about 2000 RPM. In some embodiments, the auger rotates at a rate of about 900 rotations per minute (RPM) to about 2000 RPM. In some embodiments, the auger rotates at a rate of about 1000 rotations per minute (RPM) to about 2000 RPM. In some embodiments, the auger rotates at a rate of about 1100 rotations per minute (RPM) to about 2000 RPM. In some embodiments, the auger rotates at a rate of about 1200 rotations per minute (RPM) to about 2000 RPM. In some embodiments, the auger rotates at a rate of about 1300 rotations per minute (RPM) to about 2000 RPM. In some embodiments, the auger rotates at a rate of about 1400 rotations per minute (RPM) to about 2000 RPM. In some embodiments, the auger rotates at a rate of about 1500 rotations per minute (RPM) to about 2000 RPM. In some embodiments, the auger rotates at a rate of about 1600 rotations per minute (RPM) to about 2000 RPM. In some embodiments, the auger rotates at a rate of about 1700 rotations per minute (RPM) to about 2000 RPM. In some embodiments, the auger rotates at a rate of about 1800 rotations per minute (RPM) to about 2000 RPM. In some embodiments, the auger rotates at a rate of about 1900 rotations per minute (RPM) to about 2000 RPM. In some embodiments, the auger rotates at a rate of about 100 rotations per minute (RPM) to about 1900 RPM. In some embodiments, the auger rotates at a rate of about 100 rotations per minute (RPM) to about 1800 RPM. In some embodiments, the auger rotates at a rate of about 100 rotations per minute (RPM) to about 1700 RPM. In some embodiments, the auger rotates at a rate of about 100 rotations per minute (RPM) to about 1600 RPM. In some embodiments, the auger rotates at a rate of about 100 rotations per minute (RPM) to about 1500 RPM. In some embodiments, the auger rotates at a rate of about 100 rotations per minute (RPM) to about 1400 RPM. In some embodiments, the auger rotates at a rate of about 100 rotations per minute (RPM) to about 1300 RPM. In some embodiments, the auger rotates at a rate of about 100 rotations per minute (RPM) to about 1200 RPM. In some embodiments, the auger rotates at a rate of about 100 rotations per minute (RPM) to about 1100 RPM. In some embodiments, the auger rotates at a rate of about 100 rotations per minute (RPM) to about 1000 RPM. In some embodiments, the auger rotates at a rate of about 100 rotations per minute (RPM) to about 900 RPM. In some embodiments, the auger rotates at a rate of about 100 rotations per minute (RPM) to about 800 RPM. In some embodiments, the auger rotates at a rate of about 100 rotations per minute (RPM) to about 700 RPM. In some embodiments, the auger rotates at a rate of about 100 rotations per minute (RPM) to about 600 RPM. In some embodiments, the auger rotates at a rate of about 100 rotations per minute (RPM) to about 500 RPM. In some embodiments, the auger rotates at a rate of about 100 rotations per minute (RPM) to about 400 RPM. In some embodiments, the auger rotates at a rate of about 100 rotations per minute (RPM) to about 300 RPM. In some embodiments, the auger rotates at a rate of about 100 rotations per minute (RPM) to about 200 RPM. In some embodiments, the auger rotates at a rate of about 300 rotations per minute (RPM) to about 1200 RPM.

In some embodiments, the particles are discharged from the mixer in an average time from about 1 second to about 20 seconds. In some embodiments, the particles move from the inlet to the outlet, or are discharged from the mixer, in an average time from about 1 second to about 20 seconds. In some embodiments, the particles move from the inlet to the outlet, or are discharged from the mixer, in an average time from about 2 second to about 20 seconds. In some embodiments, the particles move from the inlet to the outlet, or are discharged from the mixer, in an average time from about 3 second to about 20 seconds. In some embodiments, the particles move from the inlet to the outlet, or are discharged from the mixer, in an average time from about 3 second to about 20 seconds. In some embodiments, the particles move from the inlet to the outlet, or are discharged from the mixer, in an average time from about 4 second to about 20 seconds. In some embodiments, the particles move from the inlet to the outlet, or are discharged from the mixer, in an average time from about 5 second to about 20 seconds. In some embodiments, the particles move from the inlet to the outlet, or are discharged from the mixer, in an average time from about 6 second to about 20 seconds. In some embodiments, the particles move from the inlet to the outlet, or are discharged from the mixer, in an average time from about 7 second to about 20 seconds. In some embodiments, the particles move from the inlet to the outlet, or are discharged from the mixer, in an average time from about 8 second to about 20 seconds. In some embodiments, the particles move from the inlet to the outlet, or are discharged from the mixer, in an average time from about 9 second to about 20 seconds. In some embodiments, the particles move from the inlet to the outlet, or are discharged from the mixer, in an average time from about 10 second to about 20 seconds. In some embodiments, the particles move from the inlet to the outlet, or are discharged from the mixer, in an average time from about 11 second to about 20 seconds. In some embodiments, the particles move from the inlet to the outlet, or are discharged from the mixer, in an average time from about 12 second to about 20 seconds. In some embodiments, the particles move from the inlet to the outlet, or are discharged from the mixer, in an average time from about 13 second to about 20 seconds. In some embodiments, the particles move from the inlet to the outlet, or are discharged from the mixer, in an average time from about 14 second to about 20 seconds. In some embodiments, the particles move from the inlet to the outlet, or are discharged from the mixer, in an average time from about 15 second to about 20 seconds. In some embodiments, the particles move from the inlet to the outlet, or are discharged from the mixer, in an average time from about 16 second to about 20 seconds. In some embodiments, the particles move from the inlet to the outlet, or are discharged from the mixer, in an average time from about 17 second to about 20 seconds. In some embodiments, the particles move from the inlet to the outlet, or are discharged from the mixer, in an average time from about 18 second to about 20 seconds. In some embodiments, the particles move from the inlet to the outlet, or are discharged from the mixer, in an average time from about 19 second to about 20 seconds. In some embodiments, the particles move from the inlet to the outlet, or are discharged from the mixer, in an average time from about 1 second to about 19 seconds. In some embodiments, the particles move from the inlet to the outlet, or are discharged from the mixer, in an average time from about 1 second to about 18 seconds. In some embodiments, the particles move from the inlet to the outlet, or are discharged from the mixer, in an average time from about 1 second to about 17 seconds. In some embodiments, the particles move from the inlet to the outlet, or are discharged from the mixer, in an average time from about 1 second to about 16 seconds. In some embodiments, the particles move from the inlet to the outlet, or are discharged from the mixer, in an average time from about 1 second to about 15 seconds. In some embodiments, the particles move from the inlet to the outlet, or are discharged from the mixer, in an average time from about 1 second to about 14 seconds. In some embodiments, the particles move from the inlet to the outlet, or are discharged from the mixer, in an average time from about 1 second to about 13 seconds. In some embodiments, the particles move from the inlet to the outlet, or are discharged from the mixer, in an average time from about 1 second to about 12 seconds. In some embodiments, the particles move from the inlet to the outlet, or are discharged from the mixer, in an average time from about 1 second to about 11 seconds. In some embodiments, the particles move from the inlet to the outlet, or are discharged from the mixer, in an average time from about 1 second to about 10 seconds. In some embodiments, the particles move from the inlet to the outlet, or are discharged from the mixer, in an average time from about 1 second to about 9 seconds. In some embodiments, the particles move from the inlet to the outlet, or are discharged from the mixer, in an average time from about 1 second to about 8 seconds. In some embodiments, the particles move from the inlet to the outlet, or are discharged from the mixer, in an average time from about 1 second to about 7 seconds. In some embodiments, the particles move from the inlet to the outlet, or are discharged from the mixer, in an average time from about 1 second to about 6 seconds. In some embodiments, the particles move from the inlet to the outlet, or are discharged from the mixer, in an average time from about 1 second to about 5 seconds. In some embodiments, the particles move from the inlet to the outlet, or are discharged from the mixer, in an average time from about 1 second to about 4 seconds. In some embodiments, the particles move from the inlet to the outlet, or are discharged from the mixer, in an average time from about 1 second to about 3 seconds. In some embodiments, the particles move from the inlet to the outlet, or are discharged from the mixer, in an average time from about 1 second to about 2 seconds. In some embodiments, the particles move from the inlet to the outlet, or are discharged from the mixer, in an average time from about 2 second to about 10 seconds.

In some embodiments, the particles are discharged from the outlet at an average rate of about 100 pounds per minute to about 10000 pounds of particles per minute. In some embodiments, the particles are discharged from the outlet at an average rate of about 200 pounds per minute to about 10000 pounds of particles per minute. In some embodiments, the particles are discharged from the outlet at an average rate of about 300 pounds per minute to about 10000 pounds of particles per minute. In some embodiments, the particles are discharged from the outlet at an average rate of about 400 pounds per minute to about 10000 pounds of particles per minute. In some embodiments, the particles are discharged from the outlet at an average rate of about 500 pounds per minute to about 10000 pounds of particles per minute. In some embodiments, the particles are discharged from the outlet at an average rate of about 600 pounds per minute to about 10000 pounds of particles per minute. In some embodiments, the particles are discharged from the outlet at an average rate of about 700 pounds per minute to about 10000 pounds of particles per minute. In some embodiments, the particles are discharged from the outlet at an average rate of about 800 pounds per minute to about 10000 pounds of particles per minute. In some embodiments, the particles are discharged from the outlet at an average rate of about 900 pounds per minute to about 10000 pounds of particles per minute. In some embodiments, the particles are discharged from the outlet at an average rate of about 1000 pounds per minute to about 10000 pounds of particles per minute. In some embodiments, the particles are discharged from the outlet at an average rate of about 2000 pounds per minute to about 10000 pounds of particles per minute. In some embodiments, the particles are discharged from the outlet at an average rate of about 3000 pounds per minute to about 10000 pounds of particles per minute. In some embodiments, the particles are discharged from the outlet at an average rate of about 4000 pounds per minute to about 10000 pounds of particles per minute. In some embodiments, the particles are discharged from the outlet at an average rate of about 5000 pounds per minute to about 10000 pounds of particles per minute. In some embodiments, the particles are discharged from the outlet at an average rate of about 6000 pounds per minute to about 10000 pounds of particles per minute. In some embodiments, the particles are discharged from the outlet at an average rate of about 7000 pounds per minute to about 10000 pounds of particles per minute. In some embodiments, the particles are discharged from the outlet at an average rate of about 8000 pounds per minute to about 10000 pounds of particles per minute. In some embodiments, the particles are discharged from the outlet at an average rate of about 9000 pounds per minute to about 10000 pounds of particles per minute. In some embodiments, the particles are discharged from the outlet at an average rate of about 100 pounds per minute to about 9000 pounds of particles per minute. In some embodiments, the particles are discharged from the outlet at an average rate of about 100 pounds per minute to about 8000 pounds of particles per minute. In some embodiments, the particles are discharged from the outlet at an average rate of about 100 pounds per minute to about 7000 pounds of particles per minute. In some embodiments, the particles are discharged from the outlet at an average rate of about 100 pounds per minute to about 6000 pounds of particles per minute. In some embodiments, the particles are discharged from the outlet at an average rate of about 100 pounds per minute to about 5000 pounds of particles per minute. In some embodiments, the particles are discharged from the outlet at an average rate of about 100 pounds per minute to about 4000 pounds of particles per minute. In some embodiments, the particles are discharged from the outlet at an average rate of about 100 pounds per minute to about 3000 pounds of particles per minute. In some embodiments, the particles are discharged from the outlet at an average rate of about 100 pounds per minute to about 2000 pounds of particles per minute. In some embodiments, the particles are discharged from the outlet at an average rate of about 100 pounds per minute to about 1000 pounds of particles per minute. In some embodiments, the particles are discharged from the outlet at an average rate of about 100 pounds per minute to about 900 pounds of particles per minute. In some embodiments, the particles are discharged from the outlet at an average rate of about 100 pounds per minute to about 800 pounds of particles per minute. In some embodiments, the particles are discharged from the outlet at an average rate of about 100 pounds per minute to about 700 pounds of particles per minute. In some embodiments, the particles are discharged from the outlet at an average rate of about 100 pounds per minute to about 600 pounds of particles per minute. In some embodiments, the particles are discharged from the outlet at an average rate of about 100 pounds per minute to about 500 pounds of particles per minute. In some embodiments, the particles are discharged from the outlet at an average rate of about 100 pounds per minute to about 400 pounds of particles per minute. In some embodiments, the particles are discharged from the outlet at an average rate of about 100 pounds per minute to about 300 pounds of particles per minute. In some embodiments, the particles are discharged from the outlet at an average rate of about 100 pounds per minute to about 200 pounds of particles per minute. In some embodiments, the particles are discharged from the outlet at an average rate of about 100 pounds per minute to about 6000 pounds of particles per minute.

In some embodiments, the particles are discharged from the outlet at an average rate of about 1 ton per hour to about 200 tons per hour. In some embodiments, the particles are discharged from the outlet at an average rate of about 2 tons per hour to about 200 tons per hour. In some embodiments, the particles are discharged from the outlet at an average rate of about 3 tons per hour to about 200 tons per hour. In some embodiments, the particles are discharged from the outlet at an average rate of about 4 tons per hour to about 200 tons per hour. In some embodiments, the particles are discharged from the outlet at an average rate of about 5 tons per hour to about 200 tons per hour. In some embodiments, the particles are discharged from the outlet at an average rate of about 6 tons per hour to about 200 tons per hour. In some embodiments, the particles are discharged from the outlet at an average rate of about 7 tons per hour to about 200 tons per hour. In some embodiments, the particles are discharged from the outlet at an average rate of about 8 tons per hour to about 200 tons per hour. In some embodiments, the particles are discharged from the outlet at an average rate of about 9 tons per hour to about 200 tons per hour. In some embodiments, the particles are discharged from the outlet at an average rate of about 10 tons per hour to about 200 tons per hour. In some embodiments, the particles are discharged from the outlet at an average rate of about 20 tons per hour to about 200 tons per hour. In some embodiments, the particles are discharged from the outlet at an average rate of about 40 tons per hour to about 200 tons per hour. In some embodiments, the particles are discharged from the outlet at an average rate of about 60 tons per hour to about 200 tons per hour. In some embodiments, the particles are discharged from the outlet at an average rate of about 80 tons per hour to about 200 tons per hour. In some embodiments, the particles are discharged from the outlet at an average rate of about 100 tons per hour to about 200 tons per hour. In some embodiments, the particles are discharged from the outlet at an average rate of about 120 tons per hour to about 200 tons per hour. In some embodiments, the particles are discharged from the outlet at an average rate of about 140 tons per hour to about 200 tons per hour. In some embodiments, the particles are discharged from the outlet at an average rate of about 160 tons per hour to about 200 tons per hour. In some embodiments, the particles are discharged from the outlet at an average rate of about 180 tons per hour to about 200 tons per hour. In some embodiments, the particles are discharged from the outlet at an average rate of about 1 ton per hour to about 180 tons per hour. In some embodiments, the particles are discharged from the outlet at an average rate of about 1 ton per hour to about 160 tons per hour. In some embodiments, the particles are discharged from the outlet at an average rate of about 1 ton per hour to about 140 tons per hour. In some embodiments, the particles are discharged from the outlet at an average rate of about 1 ton per hour to about 120 tons per hour. In some embodiments, the particles are discharged from the outlet at an average rate of about 1 ton per hour to about 100 tons per hour. In some embodiments, the particles are discharged from the outlet at an average rate of about 1 ton per hour to about 80 tons per hour. In some embodiments, the particles are discharged from the outlet at an average rate of about 1 ton per hour to about 60 tons per hour. In some embodiments, the particles are discharged from the outlet at an average rate of about 1 ton per hour to about 40 tons per hour. In some embodiments, the particles are discharged from the outlet at an average rate of about 1 ton per hour to about 20 tons per hour. In some embodiments, the particles are discharged from the outlet at an average rate of about 1 ton per hour to about 10 tons per hour. In some embodiments, the particles are discharged from the outlet at an average rate of about 1 ton per hour to about 9 tons per hour. In some embodiments, the particles are discharged from the outlet at an average rate of about 1 ton per hour to about 8 tons per hour. In some embodiments, the particles are discharged from the outlet at an average rate of about 1 ton per hour to about 7 tons per hour. In some embodiments, the particles are discharged from the outlet at an average rate of about 1 ton per hour to about 6 tons per hour. In some embodiments, the particles are discharged from the outlet at an average rate of about 1 ton per hour to about 5 tons per hour. In some embodiments, the particles are discharged from the outlet at an average rate of about 1 ton per hour to about 4 tons per hour. In some embodiments, the particles are discharged from the outlet at an average rate of about 1 ton per hour to about 3 tons per hour. In some embodiments, the particles are discharged from the outlet at an average rate of about 1 ton per hour to about 2 tons per hour. In some embodiments, the particles are discharged from the outlet at an average rate of about 3 tons per hour to about 180 tons per hour. In some embodiments, the particles can processed at a rate of about 1000 lbs/min to about 5000 lbs/min. In some embodiments, the particles are processed (e.g. coated) at a rate of about 1000 lbs/min, about 2000 lbs/min, about 3000 lbs/min, about 4000 lbs/min, or about 5000/lbs min. In some embodiments, the particles are processed at rate of about 90 tons per hour (TPH) to about 150 (tons per hour). In some embodiments, the particles are processed at a rate of about 80 TPH, about 90 TPH, about 100 TPH, about 110 TPH, about 120 TPH, about 130 TPH, about 140 TPH, or about 150 TPH.

In some embodiments, the methods further comprises mixing the annulus of particles with a second coating composition that is fed into the mixer through a second dosing port. The second coating composition can be the same or different than the first coating composition. The mixer also allows for numerous ports that can be used to inject or mix additional compositions or the same compositions along the mixer. The method can therefore, in some embodiments, comprise injecting at 1, 2, 3, 4, 5, 6, 7, 8, 9, or 10 through a dosing port a composition or gas as described herein. The compositions that can be injected through the various ports can be the same or different. The gas and the coating composition can be placed into the mixer through the same port even if they are being added through the different lines, as shown, for example, in FIG. 2.

In some embodiments, the method further comprises feeding a second coating composition into one or more dosing ports of the first mixer, wherein the second coating composition is the same or different than the first coating composition. In some embodiments, the method further comprises feeding a third coating composition into one or more dosing ports of the first mixer, wherein the third coating composition is the same or different than the first and/or the second coating composition. In some embodiments, any of the coating compositions can be added to the method at any dosing port available in any of the mixers described herein. In some embodiments, any of the coating compositions can be added to only one dosing port in any of the mixers described herein. In some embodiments, any of the coating compositions can be added to two or more dosing ports in any of the mixers described herein. In some embodiments, any of the coating compositions can be added at the same time or at different times during the method. For example, a coating composition can be added at a dosing port closer to the inlet at the start of the method, and added again at a different dosing port closer to the outlet toward the end of the method.

In some embodiments, the method comprises heating the first coating composition or the second coating composition above their melting point prior to feeding the coating compositions into one or more dosing ports of the first mixer or prior to mixing the coating compositions with the particles in the mixing chamber of the mixer. In some embodiments, the first temperature is greater than the melting point of any of the coating compositions described herein or used with the mixer. In some embodiments, any of the heated coating compositions are fed into the mixer with a gas propellant. In some embodiments, the heated coating compositions are fed into the mixer via one or more chemical lines attached to one or more dosing ports. In some embodiments, the heated coating compositions are fed into the mixer with a gas propellant that is fed into the mixer via a gas line attached to one or more dosing ports as the heated coating compositions are fed into the same one or more dosing ports via the chemical line. An non-limiting illustration of some embodiments, can be seen, for example in FIG. 2, which is described herein for illustrative purposes only.

In some embodiments, the method comprises feeding at least a first gas into one or more dosing ports of the first mixer. The gas and the chemical composition can essentially be added through one dosing port at the same time. Without being bound by any theory, the gas can help push the chemical composition into the mixer. In some embodiments, the gas fills, or is capable of filling, a space in the center of the particle annulus in the first mixer. In some embodiments, the gas that fills, or is capable of filling, the space in the center of the particle annulus is the same gas as the gas propellant that is fed into the mixer with the heated coating compositions. In some embodiments, the gas that fills, or is capable of filling, the space in the cater of the particle annulus is different that the gas propellant that is fed into the mixer with the heated coating compositions. In some embodiments, the gas comprises one or more of air, oxygen, nitrogen, carbon dioxide, or catalysts. In some embodiments, the gas is oxygen. In some embodiments, the gas is nitrogen. In some embodiments, the gas is carbon dioxide. In some embodiments, the gas is a combination of oxygen, nitrogen and carbon dioxide. In some embodiments, the gas is compressed air. In some embodiments, the gas is oxygen and nitrogen. In some embodiments, the combination of gas is carbon dioxide and nitrogen. In some embodiments, the combination is oxygen and carbon dioxide. In some embodiments, gas is fed into the mixer before the particles are introduced into the mixer. In some embodiments, the gas is heated before it is fed into the mixer. In some embodiments, the gas is heated to a temperature that is greater than the melting point of any of the coating compositions that is used with the mixer. In some embodiments, the gas is heated to a temperature that is greater than the temperature of the particles are heated to before they are fed into the mixer.

In some embodiments, any of the mixers and methods described herein can be used with a range of particle types. In some embodiments, the particles are "proppants" used in the hydraulic fracturing to keep the strata cracks open as oil, gas, water, and other fluids pass or flow through those cracks. In some embodiments, the particles are selected from the group consisting of sand, bauxite, silica, metal, ceramic and synthetic organic particles. In some embodiments, the particles are sand particles. In some embodiments, the particles are c particles. In some embodiments, the particles are ceramic particles. In some embodiments, the particles are synthetic organic particles. In some embodiments, the particles can be virtually any small solid with an adequate crush strength and lack of chemical reactivity, such as those that can be used as proppants to extract hydrocarbons from a well.

In some embodiments, any of the mixers, particles and methods described herein can be used with a range of coating compositions. For example, the coating composition that can be formed can be a polyurethane coating composition. Polyurethane reaction products of polyols and isocyanates are disclosed, for example, U.S. patent application Ser. No. 13/099,893; application Ser. No. 13/188,530; application Ser. No. 13/224,726; and application Ser. No. 15/073, 840 the disclosures of which are herein incorporated by reference. Such polyurethane-based proppant coatings are economically and environmentally desirable for a number of reasons, all of which suggest that the development and use of such coating would be highly desirable. Other coating compositions can be also be used with this methods and mixers described herein. For examples, coating compositions and coatings are described in U.S. patent application Ser. No. 14/528,070, U.S. patent application Ser. No. 14/798,774, U.S. patent application Ser. No. 14/928,379, U.S. patent application Ser. No. 15/003,118, U.S. patent application Ser. No. 15/153,099, U.S. Pat. Nos. 8,993,489, 9,040,467, 9,290,690, 9,725,645, 8,763,700, 9,624,421, 9,562,187, 9,518,214, U.S. patent application Ser. No. 13/897,288, U.S. patent application Ser. No. 15/073,840, PCT Application No. PCT/US2016/032104, U.S. Pat. No. 9,790,422, U.S. Provisional Patent Application No. 62/421, 488, U.S. Provisional Patent Application No. 62/422,961, U.S. Provisional Patent Application No. 62/426,888, U.S. Provisional Patent Application No. 62/570,206, each of which is hereby incorporated by reference in its entirety. Other coatings can be acrylic coatings, resin coatings, and dust reducing coatings, such as described herein and incorporated by reference.

The coating compositions may be applied in more than one layer. In some embodiments, each of the layers described herein are repeated as necessary (e.g. 1-5 times, 2-4 times or 2-3 times) to obtain the desired coating thickness. The layers can be formed by using, for example, the plurality of the ports described herein and using them to sequentially add coating layers as the particles move down the mixing chamber. Thus, the thickness of the coating of the particle can be adjusted and used as either a relatively narrow range of particle size or blended with particles of other sizes, such as those with more or less numbers of coating layers of phenolic novolac resin, phenolic resole resin, polyurethane or polyurethane dispersions, epoxy or epoxy dispersions as described herein. This can also be used to form a particulate blend have more than one range of size distribution.

Embodiments disclosed herein provide coated particulates that are prepared utilizing the mixer described herein. Embodiments disclosed herein provide coated particulates that are prepared according to the methods described herein.

In order that the embodiments disclosed herein may be more efficiently understood, examples are provided below. It should be understood that these examples are for illustrative purposes only and are not to be construed as limiting the embodiments in any manner.

EXAMPLES

Example 1: Preparation of Dust Reducing Coated Particulates

Sand was added to a mixer as described herein at a temperature of 75 degrees Fahrenheit. The sand was mixed with a dust reduction coating, which is described in U.S. patent application Ser. No. 14/798,774, which is hereby incorporated by reference in its entirety. The coating composition was added at two dosing ports along the length of the mixer. The sand was processed at a rate of about 150 pounds per hour. The coating composition was added at a rate of about 9 pounds per minute. The chemical is injected into the mixer with the assistance of compressed air. The sand was allowed to be discharged from the mixer and was captured. The sand was found to be adequately coated with a dust reduction coating.

Example 2: Hydrophobic Coated Particles

The mixer described herein was also able to coat particles that were hydrophobic. Sand particles heated at a temperature of about 250 degrees Fahrenheit was added to the mixer at a rate of 150 tons per hour. At a first port, the dust reduction coating of Example 1 was added to the mixer, at a plurality of ports that are after the first port, an amorphous poly-alphaolefin was added to the mixer. The chemicals are injected into the mixer with the assistance of compressed air. The coated particles were found to be hydrophobic.

Example 3: Hydrophobic Coated Particles

Sand was added to a mixer that had 20 ports, ten on each side of the longitudinal axis of the mixer. The sand was added at a temperature of about 220 degrees Fahrenheit. A dibutyltin dilaurate catalyst, silane, polyol, and isocyanate were added to the mixer throughout the various ports. The sand was processed at a rate of about 150 tons per hour. The coated sand was found to be hydrophobic.

Example 4: Coated Particles Using Multiple Mixers

Sand was introduced into a first mixer at a temperature of about 190 degrees Fahrenheit. The sand was coated with a silane, a polyol, a catalyst, and an isocyanate. The sand was discharged from the first mixer into a second mixer and coated with a silane again as an outer layer and finally treated with fumed silica. The sand was processed at 150 tons per hour. The chemicals are injected into the mixer with the assistance of compressed air.

Example 4: Coated Particles Using Multiple Mixers

Sand was introduced into a first mixer at a temperature of about 190 degrees Fahrenheit. The sand was coated with a silane, a polyol, a catalyst, and an isocyanate. The sand was discharged from the first mixer into a second mixer and coated with a silane again as an outer layer and finally treated with fumed silica. The chemicals are injected into the mixer with the assistance of compressed air. The sand was processed at 150 tons per hour.

Example 5: Coated Particles Using Multiple Mixers

Sand was introduced into a first mixer at a temperature of about 210 degrees Fahrenheit. The sand was coated with a silane, a polyol, a catalyst as described above, and a tertiary amine catalyst, and an isocyanate. The sand was discharged from the first mixer into a second mixer and treated with a surfactant. The chemicals are injected into the mixer with the assistance of compressed air. The sand was processed at 150 tons per hour.

Example 6: Coated Particles Using a Single Mixer

Sand was introduced into a first mixer at a temperature of about 190-220 degrees Fahrenheit. The sand was coated at a rate of 3000 lbs/min. Ports coated the sand with a silane, a polyol, and a isocyanate in the following order: 1) Silane, 2) Polyol, 3) Polyol, 4) Isocyanate, 5) Isocyanate, and 6) Silane. The sand was coated effectively with these chemicals at the rate of 3000 lbs/min. The chemicals were not heated before being mixed with the pre-heated sand.

Example 7: Coating Sand with Multiple Mixers

Sand was introduced into a first mixer at a temperature of about 190-220 degrees Fahrenheit. The sand was coated at a rate of 3000 lbs/min. In the first mixer, the sand was coated with the following components in the following order using different ports: Silane, Polyol, Polyol, Isocyanate, Isocyanate. The coated sand is discharged into a second mixer and coated with the following components in the following order using different ports: Polyol, Polyol, Isocyanate, Isocynate, and Silane. The sand was effectively coating by using the mixers in serial fashion. None of the chemicals were heated before being contacted with the sand.
Coating Sand with Multiple Layers Using Multiple Mixers:
Sand was introduced into a first mixer at a temperature of about 190-220 degrees Fahrenheit. The sand was coated at a rate of 3000 lbs/min. The sand was coated with a silane, followed by a polyurethane coating formed from a polyol and isocyanate that was contacted with the sand using 8 different ports (4 for each of the polyol and the isocyanate). The coated sand (single layer) was then discharged into a second mixer and was coated with another layer of a silane. The coatings were performed with different ratios of polyol and isocyanate demonstrating that the polyurethanes that can be formed using the mixers in serial (one after the other).

The examples provided herein demonstrate the use of a mixer that can coat at least 3000 lbs/min of sand using the multiple ports to mix the sand with various chemicals is an unexpected result because the speed at which the sand be coated could not have been predicted. The positions and use of the various ports allow a user of the mixers to adjust the ratios and compositions of the coatings that are formed on the sand or other substrate.

From the foregoing, it will be appreciated that various embodiments of the present disclosure have been described herein for purposes of illustration, and that various modifications can be made without departing from the scope and spirit of the present disclosure. Accordingly, the various embodiments disclosed herein are not intended to be limiting.

What is claimed:
1. A method of producing coated sand particles comprising:
   injecting a gas into one or more dosing ports of a first mixer,
   feeding heated sand particles that are at a temperature of about 185 to about 260 degrees Fahrenheit into an inlet of the first mixer, the first mixer comprising an outer wall and a single auger comprising a rotating shaft and a plurality of paddles connected to the rotating shaft,
   wherein the single auger of the first mixer is rotating at a rate of about 300 rotations per minute (RPM) to about 1200 RPM to form an annulus of sand particles positioned along the interior surface of the outer wall of the first mixer and moving the sand particles towards an outlet of the first mixer, wherein the gas fills a space in the center of the annulus of sand particles in the first mixer;
   mixing the annulus of heated sand particles with a first coating composition and a second coating-composition,
   wherein the first coating composition is fed into the mixer through a first dosing port operably connected to the first mixer and the second coating composition is fed into the mixer through a second dosing port operably connected to the first mixer; and
   discharging the coated sand particles through the outlet, wherein the sand particles are coated at a rate of at least 3000 pounds per minute.
2. The method of claim 1, wherein the sand particles move from the inlet to the outlet in an average time from about 2 seconds to about 15 seconds.
3. The method of claim 1, wherein the sand particles are coated at a rate of 3000 pounds per minute.
4. The method of claim 1, wherein the first mixer further comprises at least a second dosing port operably connected to the mixer.
5. The method of claim 4, wherein the method further comprises mixing the annulus of sand particles with a second coating composition that is fed into the mixer through the second dosing port.

6. The method of claim 1, wherein the gas is injected with the coating composition.

7. The method of claim 1 wherein each paddle of the plurality of paddles of the first mixer has an orientation from about −45 degrees to about +45 degrees in relation to the horizontal axis of the rotating shaft.

8. The method of claim 7, wherein each paddle has an orientation of −45 degrees, 0 degrees, or +45 degrees or wherein the plurality of paddles are oriented at −45 degrees.

9. The method of claim 1, wherein the plurality of paddles of the first mixer are grouped into an inlet zone, a middle zone, and an outlet zone.

10. The method of claim 9, wherein the plurality of paddles in the inlet zone are oriented randomly at either −45 degrees, 0 degrees, or +45 degrees.

11. The method of claim 9, wherein all of the paddles in the inlet zone are oriented at 0 degrees or at +45 degrees.

12. The method of claim 1, further comprising at least a second mixer arranged in parallel with the first mixer, such that sand particles are fed into the inlet of the first mixer at or approximately at the same time as sand particles are fed into an inlet of the second mixer.

13. The method of claim 12, further comprising the steps of:
heating the sand particles to a first temperature in a container;
feeding the heated sand particles from the container into the inlet of the first mixer and the inlet of the second mixer, such that heated sand particles are fed into the inlet of the first mixer at or approximately at the same time as heated sand particles are fed into the inlet of the second mixer.

14. The method of claim 1, wherein the first coating composition comprises a polyol and the second coating composition comprises an isocyanate, wherein the first and second coating compositions coat the sand with a polyurethane coating.

15. The method of claim 14, wherein the first or second coating composition comprises a silane.

16. The method of claim 1, wherein the heated sand is at a temperature of about 190 to about 220 degrees Fahrenheit.

17. The method of claim 1, wherein the gas comprises one or more of air, oxygen, nitrogen, carbon dioxide, and catalysts.

18. The method of claim 1, wherein the gas comprises one or more of air, oxygen, nitrogen, and carbon dioxide.

* * * * *